United States Patent [19]

Koslov et al.

[11] Patent Number: 4,845,562
[45] Date of Patent: Jul. 4, 1989

[54] WIDESCREEN TELEVISION RECEPTION AND RECORDING SYSTEM UTILIZING CONVENTIONAL EQUIPMENT

[75] Inventors: Joshua L. Koslov, East Windsor; Michael A. Isnardi, Plainsboro; Robert E. Flory, Princeton; Edward R. Campbell, III, Tabernacle, all of N.J.

[73] Assignee: RCA Licensing Corporation, Princeton, N.J.

[21] Appl. No.: 205,403

[22] Filed: Jun. 10, 1988

[51] Int. Cl.[4] .................... H04N 7/08; H04N 11/06
[52] U.S. Cl. .................................... 358/141; 358/12
[58] Field of Search ............... 358/12, 14, 15, 141, 358/142, 146

[56] References Cited

U.S. PATENT DOCUMENTS

| 4,613,903 | 9/1986 | Nadan | 358/141 |
| 4,623,922 | 11/1986 | Wischermann | 358/160 |
| 4,661,863 | 4/1987 | Ichinoi | 358/334 |
| 4,672,443 | 6/1987 | Dischert et al. | 358/12 |

OTHER PUBLICATIONS

"HDTV—Sooner than You Think"; by Brian Fenton; Radio-Electronics; Jan. 1988.
McComb, Gordon, "Super Pictures from Super-VHS", Popular Science, 1/88, pp. 68-70 & 114.
Preliminary Information Bulletin on "VHS Recorder with RGB Inputs for D2-MAC Recordings", Thomson Consumer R&D Laboratories, 11/87.
U.S. patent application Ser. No. 038,260, "Television Picture Zoom System", S. Shiratsuchi, filed 4/14/87.
Garault, T. et al., "A Digital MAC Decoder for the Display of a 16/9 Aspect Ratio Picture on a Conventional TV Receiver", IEEE Trans. on Consumer Electronics, vol. 34, No. 1, Feb. 1988, pp. 137-146.

Primary Examiner—James J. Groody
Assistant Examiner—Michael D. Parker
Attorney, Agent, or Firm—Eugene M. Whitacre; Eric P. Herrmann; Ronald H. Kurdyla

[57] ABSTRACT

A system is disclosed for partially decoding an encoded widescreen, extended definition television signal into a signal that is compatible with existing consumer video cassette recorders (VCRs) and video monitors. The encoded signal is compatible with existing television standards to produce a video image having a conventional 4:3 aspect ratio. Signals representing side panel information, to be appended onto either side of the 4:3 center panel, are encoded in the signal and are not visible in the image produced by a conventional receiver. The disclosed system includes decoding circuitry which recovers the side panel signals, appends them to the center panel signal and changes the time correspondence of the total signal so that it represents an image having a 5:3 aspect ratio. Luminance and chrominance components of the decoded video signal are provided as output signals of the decoder and to input ports of a conventional video cassette recorder (VCR) such as an S-VHS or ED-Beta machine. The signal recorded on the VCR may be replayed on a widescreen monitor. The decoder includes an optional vertical interpolator to compress the widescreen picture vertically to generate a signal which produces a properly proportioned widescreen image when displayed on a conventional display device.

13 Claims, 18 Drawing Sheets

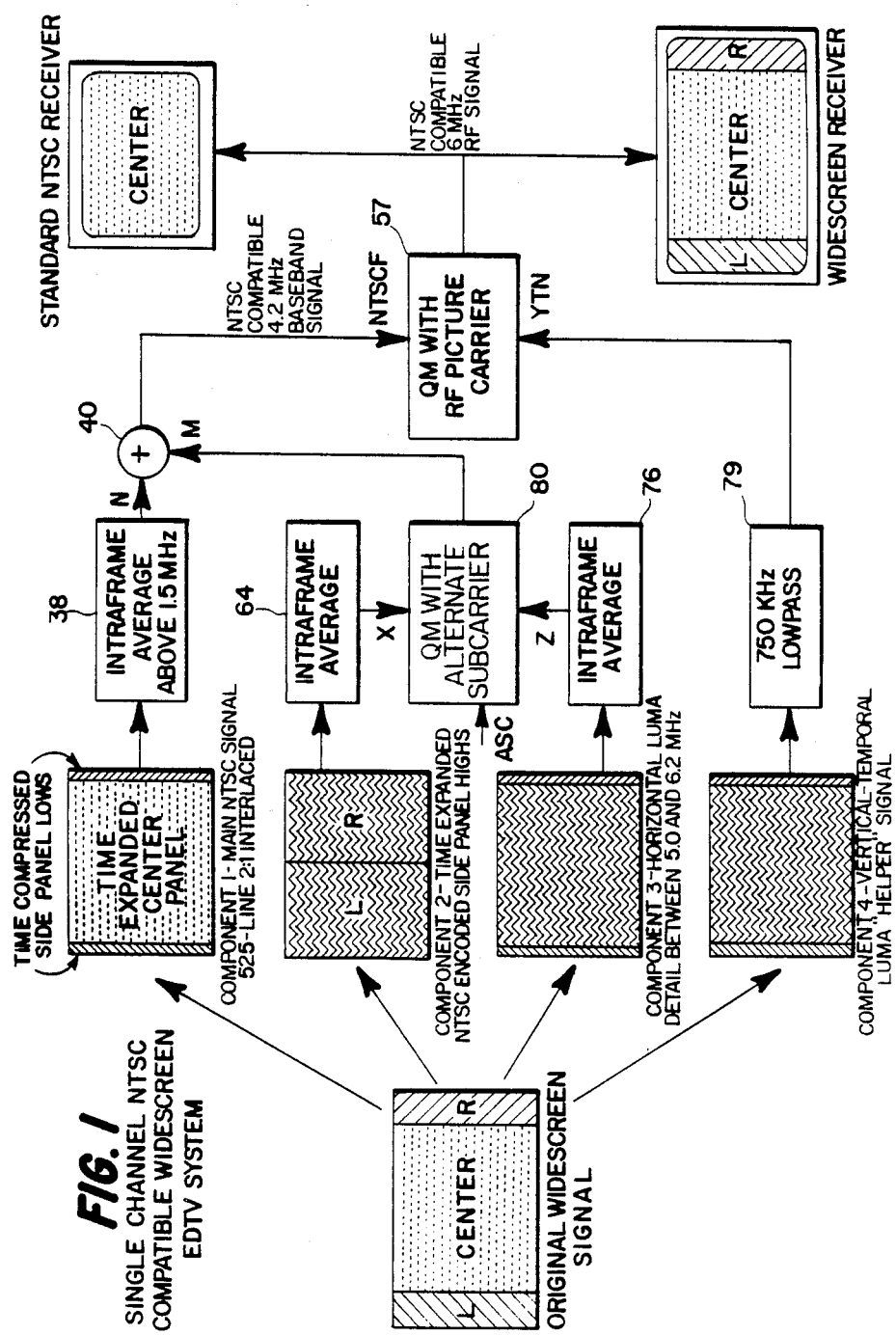

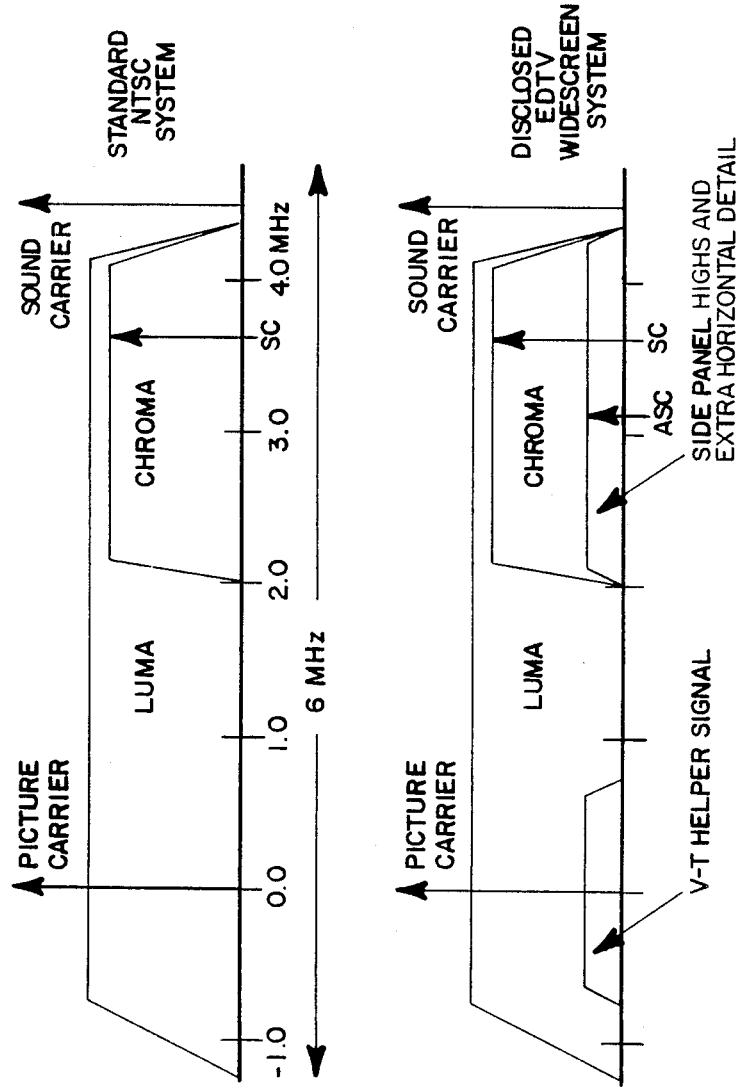

WIDESCREEN TELEVISION RECEPTION AND RECORDING SYSTEM UTILIZING CONVENTIONAL EQUIPMENT

The present invention relates to apparatus for converting a television signal which represents an image having an aspect ratio such as 5:3 into a signal which may be recorded by a conventional recorder and displayed either on a conventional 4:3 aspect ratio receiver or on a widescreen television receiver.

Recently, a great deal of interest has been expressed in television systems which provide an image aspect ratio (i.e., the ratio of the width to the height of the image) such as 2:1, 16:9 or 5:3, which is greater than the 4:3 aspect ratio of television systems conforming to a conventional standard, such as NTSC. The wider aspect ratios are more in-line with human visual perception than the conventional 4:3 aspect ratio. Consequently, present day motion picture films produce images with an aspect ratio of 5:3 or greater.

It is desirable for a new transmission system, that produces a widescreen television signal, to be compatible with the existing transmission standard and with existing conventional television receivers. This means that the widescreen television signal should be capable of being transmitted through a single channel of the conventional transmission system and that the received widescreen signal be processed by a conventional receiver so as to produce a conventional aspect ratio image, without significant distortion.

One such compatible widescreen television transmission system is described in U.S. Patent application Ser. No. 078,150, entitled "Compatible Widescreen Television System", filed in the U.S. Patent and Trademark Office on July 27, 1987 in the names of C. H. Strolle, T. R. Smith, B. J. Roeder and M. A. Isnardi. This system uses a widescreen television camera that is capable of scanning a scene so as to generate a widescreen television signal corresponding to an image having an aspect ratio (e.g. 5:3) that is greater than the 4:3 aspect ratio of a conventional television signal. The widescreen television signal has an active line interval, containing one horizontal line of image information, that is the same as the active line interval of a conventional aspect ratio television signal (e.g. approximately 52.5 microseconds for NTSC).

If the image represented by a widescreen television signal were reproduced directly on a conventional television receiver, the image would appear to be compressed in the horizontal direction; objects would appear thinner than normal. Moreover, to achieve equivalent horizontal resolution in the reproduced image, the widescreen signal has a greater bandwidth than a conventional signal. Consequently, there may also be a loss in horizontal resolution if the widescreen signal is transmitted through a conventional television channel.

To solve these problems, the widescreen television system described in the Strolle et al. patent application uses an encoder to convert the widescreen television signal into an encoded television signal which contains sufficient information to faithfully reproduce a widescreen image and which is also compatible with the conventional NTSC transmission system. When the encoded signal is received and processed by a widescreen television receiver, such as that described in the Strolle et al. application, a widescreen image is produced. When the signal is processed by a conventional television receiver, an image having a conventional aspect ratio and no significant degradation or artifacts is produced.

Basically, the encoder expands, in time, portions of the widescreen television signal corresponding to a 4:3 center portion (the center panel) of the image, and compresses, in time, the portions (the side panels) of the widescreen television signal that are immediately to the left and right of the center panel portion. The compressed side panel signals occupy image overscan regions of a conventional television image and, so, are not visible on a conventional television receiver. The time-expanded center panel signal has a bandwidth compatible with the NTSC standard, but the compressed side panels do not. To accomodate the increased bandwidth of the side panel signals, the encoder partitions the side panel signals into low frequency and high frequency components. The low frequency components are compressed and combined with the expanded center panel signal to form a first component of the encoded signal. The high frequency components of the side panel signals are expanded in time to form a second component of the encoded signal.

An improved "backward compatible" widescreen television system, which also provides for enhanced or extended definition images having greater horizontal and vertical image detail than conventional images, is described in U.S. Patent Application Serial No. 139,340, entitled "Extended Definition Widescreen Television Signal Processing System", filed in the U.S. Patent and Trademark Office on Dec. 29, 1987 in the name of M. A. Isnardi.

The system described in the Isnardi application includes first and second signal components that are essentially the same as the first and second components of the system described in the Strolle et al. system. In addition, the Isnardi system includes third and fourth component signals which provide for increased horizontal and vertical resolution, respectively, in the reproduced widescreen image. The combined encoded signal is generated by quadrature modulating the second and third component signals onto a suppressed subcarrier signal, included in the band of frequencies occupied by the first component, and by quadrature modulating a video carrier signal with the combined first, second and third components as the in-phase modulating signal and the fourth component as the quadrature phase modulating signal.

The video signals produced by each of the systems described above are treated as standard resolution, standard aspect ratio television signals when received by a conventional television receiver or when recorded on a conventional consumer video cassette recorder (VCR). This is so even if the conventional receiver includes a video monitor capable of displaying a high resolution signal and even if the VCR is capable of recording high resolution video signals such as, for example, an Super VHS (S-VHS) or Extended Definition Beta (ED-Beta) machine.

It would be desirable if a system could be developed which would allow presently available equipment to be used to record and display a widescreen, highresolution image generated from an enhanced video signal.

SUMMARY OF THE INVENTION

The present invention is embodied in a system which processes an enhanced, encoded video signal representing a widescreen image to produce a decoded video signal that represents the widescreen image. The system includes circuitry which decodes selected components of the encoded video signal into a widescreen luminance signal and first and second widescreen color difference signals. Each of the signals produced by the decoder has approximately the same bandwidth as a corresponding signal component defined by a predetermined television signal standard. The system includes circuitry to modulate a suppressed chrominance subcarrier signal in quadrature with the first and second color difference signal components to generate a widescreen chrominance signal. The widescreen luminance and chrominance signals are provided as outputs of the system.

In one embodiment of the invention, the widescreen luminance and chrominance signal components are applied to luminance and chrominance signal input terminals of a consumer video cassette recorder to allow the widescreen image to be recorded and then played back via luminance and chrominance monitor input terminals on a widescreen receiver.

In another embodiment of the invention, the system includes circuitry which vertically compresses the widescreen luminance and chrominance signals to develop widescreen luminance and chrominance signals that produce a properly proportioned widescreen video image when displayed on a television screen having a conventional aspect ratio.

In yet another embodiment of the invention, the video signal decoder includes circuitry which generates a widescreen luminance signal having substantially greater bandwidth than the corresponding luminance signal component of the predetermined television signal standard. The wideband widescreen luminance signal is provided as the luminance output signal of the system.

In still another embodiment of the invention, the system includes circuitry which combines the luminance and chrominance signals produced by the decoder to generate a widescreen composite video signal which may be recorded via a composite video input terminal of a consumer video cassette recorder or may be modulated and recorded as a radio frequency video signal by the video cassette recorder.

BRIEF DESCRIPTION OF THE DRAWINGS

FIG. 1 illustrates a general overview of a compatible widescreen enhanced definition television (EDTV) encoder system;

FIGS. 1a, 1b, 1c, 2, and 2a contain diagrams that are helpful in understanding the operation of the encoder and the format of the signal produced thereby;

DETAILED DESCRIPTION OF THE DRAWINGS

Figure 1B:
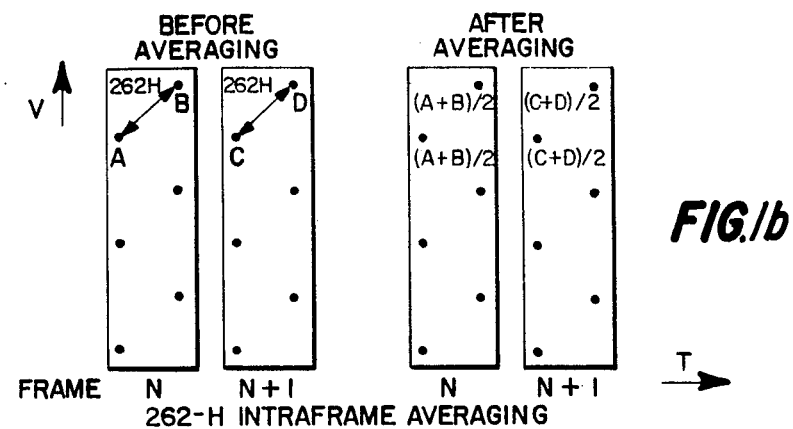

A system, such as that described in the above-referenced Isnardi patent, which is intended to transmit wide aspect ratio pictures through a standard, e.g. NTSC, broadcast channel, should produce a high quality picture display by a widescreen receiver while avoiding observable degradations in a standard aspect ratio display. As indicated above, the system described in the Isnardi reference achieves this result by splitting the widescreen wideband television signal into four component signals, one of which produces a standard aspect ratio display and three which represent enhancements of the standard display. The three enhancement signals are combined with the one signal such that they are physically or preceptually hidden in the display produced by a standard television receiver.

The first component signal is a main 2:1 interlaced signal with a standard 4:3 aspect ratio. This component includes the center panel of the widescreen signal which has been expanded in time to occupy nearly the entire active line time. The first component signal also includes side panel horizontal low frequency information that has been time compressed into the left and right horizontal image overscan regions. The low frequency side panel information is physically hidden from view since it occupies the horizontal overscan region in a standard television display.

The second component signal is an auxiliary 2:1 interlaced signal in which the left and right side panel high frequency information have each been expanded to occupy one-half of the active line time. Thus, the expanded side panel information occupies substantially the entire active line time.

The third component is an auxiliary 2:1 interlaced signal, derived from the widescreen signal source, comprising his frequency horizontal luminance detail information between approximately 5.0 and 6.2 MHz that has been shifted down in frequency to occupy a band of frequencies between 0 and 1.2 MHz.

The third and fourth components are compressed in amplitude and then used to modulate quadrature phase related suppressed alternate subcarrier signals which have a frequency that is an odd multiple of one-half of the horizontal line scanning frequency and that is within the chrominance band of the NTSC signal spectrum. In addition, these alternate subcarrier signals are subject to a 180° phase change from field to field (i.e., every 262 lines). Consequently, the third and fourth components appear as a field rate complementary color change in the image produced by a conventional NTSC receiver. Distortion of this type is generally not noticed since the human eye is relatively insensitive to rapid mutually complementary changes in color.

The fourth component is an auxiliary 2:1 interlaced "helper" signal which includes vertical-temporal (V-T) luminance detail information that would otherwise be lost in the conversion from progressive scan to interlace scan. This signal helps the EDTV receiver to reconstruct missing information in moving scenes and to reduce or eliminate unwanted flicker and motion artifacts in a progressively scanned widescreen image.

The fourth component is band-limited to have a maximum frequency of 750 KHz, mapped onto a conventional 4:3 aspect ratio, and used to modulate a carrier signal that is quadrature phase related to the picture carrier signal (also known as the video carrier signal). This signal is hidden in a conventional NTSC display because it is spatially correlated to the first component signal by the mapping process.

The first, second and third components are intraframe averaged to substantially eliminate V-T crosstalk between the first component and the second and third components. The first component is intraframe averaged only above 1.5 MHz. The modulated second and third components occupy a band of frequencies between 2 MHz and 4.2 MHz. The intraframe averaging of a signal involves averaging the values of corresponding pixels, within a given frame, that are separated by one field interval (262 lines). The averaged value is substituted for each of the original pixel values. Because of the intraframe averaging operation, the portion of the first component signal in the band of frequencies occupied by the modulated second and third components is identical from field to field and the baseband second and third components are identical from field to field, within a frame. Only the phase of the alternate subcarrier signals changes between two fields of a frame. This relationship may be exploited at the receiver to substantially separate the first component from the second and third components. The average value of corresponding samples separated by one field interval within a frame is a sample of the first component signal, and the difference between the corresponding samples, when divided by two, is a sample of the modulated second and third components.

Figure 1C:
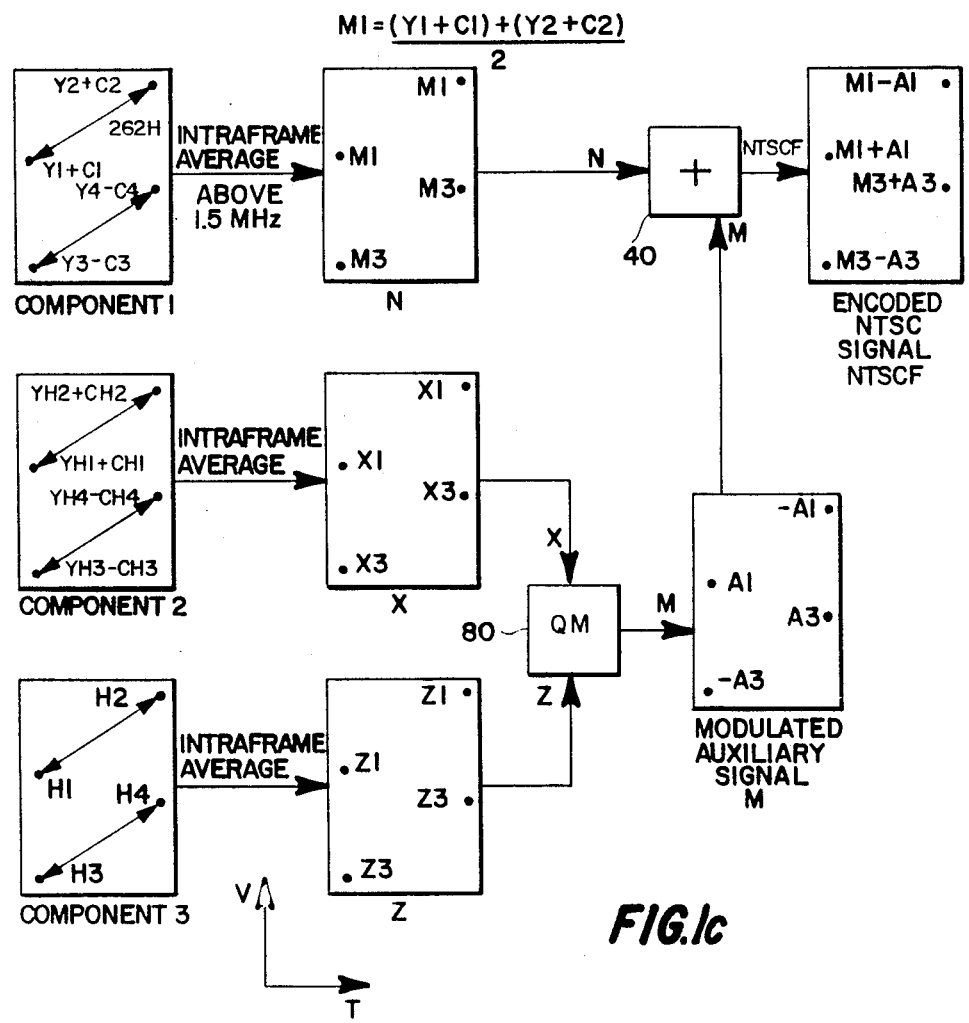

FIG. 1 is a block diagram which illustrates the encoding process described above. FIG. 1a illustrates the comparative frequency spectra of a standard NTSC signal and the EDTV signal described in the above referenced Isnardi patent. FIG. 1c illustrates the process of intraframe averaging as described above. These Figures are provided as an aid to understanding the encoding process.

Figure 2:
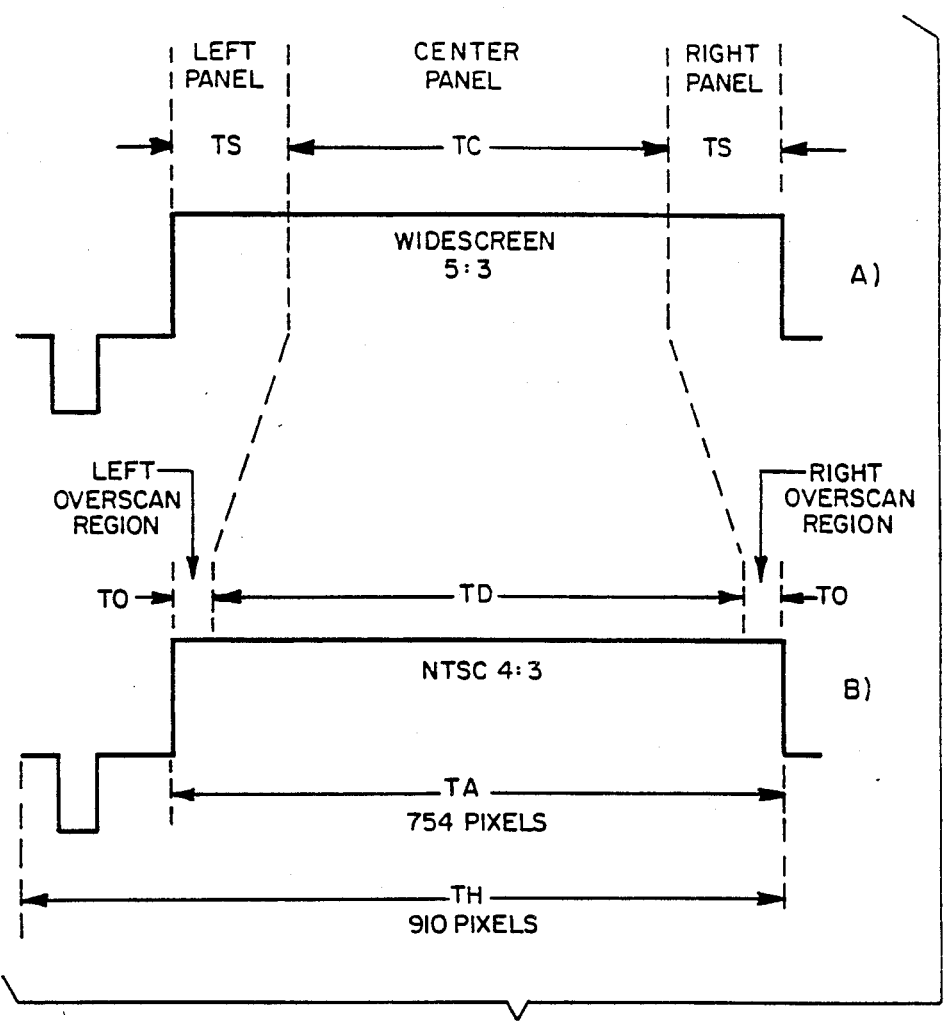

FIG. 2 illustrates the process by which the first component of the EDTV signal is generated. This process maps each horizontal line interval of the 5:3 aspect ratio signal into a horizontal line interval of the EDTV signal. As shown in FIG. 2, the center panel region of the widescreen signal is expanded in time so that the information originally conveyed in the time interval TC is mapped into the time interval TD and each of the side panel regions, which originally occupied time intervals TS, are mapped into the EDTV signal to occupy time intervals TO. In the present example, the ratio of TD to TC is 1.19, and the ratio of TO to TS is 0.16.

Figure 2A:
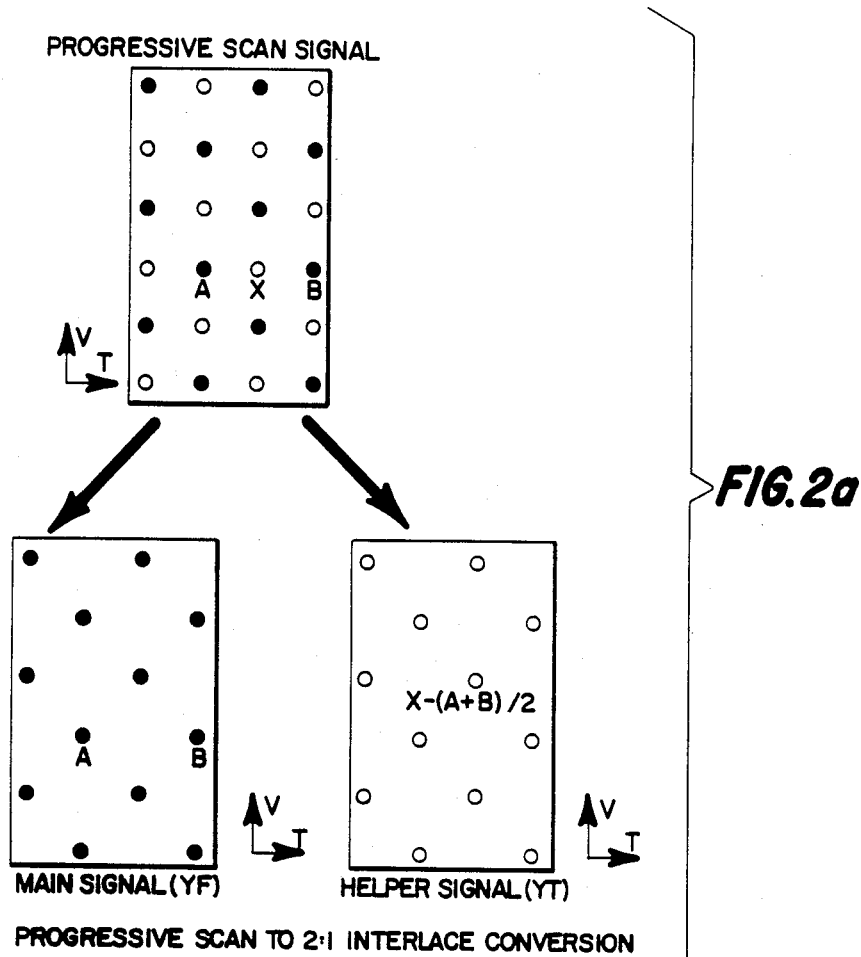

FIG. 2a illustrates how the fourth component signal, the helper signal, is developed. In FIG. 2a, a V-T diagram of the progressive scan signal produced by, for example, a widescreen video camera includes both solid dots and open circles. The dots represent lines of an interlace scan signal that are preserved for processing by the circuitry which generates the first, second and third components of the EDTV signal. The circles represent line intervals of the progressive scan signal which are discarded. In the receiver, it is assumed that the missing samples needed to produce a progressive scan display from the interlace scan signal are developed by averaging samples (e.g. A and B) that are separated by one field interval. As seen from the progressive scan V-T diagram, the ideal sample value is X. To compensate for the errors in the predicted sample values which will be generated at the receiver, the encoder determines the value of a signal YT for each pixel in each field, where:

$$YT = X - (A+B)/2 \qquad (1)$$

YT is the helper signal. In the receiver, when the decoded interlace scan video signal is converted into a progressive scan signal, the signal YT is added to the predicted missing pixel values to obtain corrected pixel values.

Figure 3:
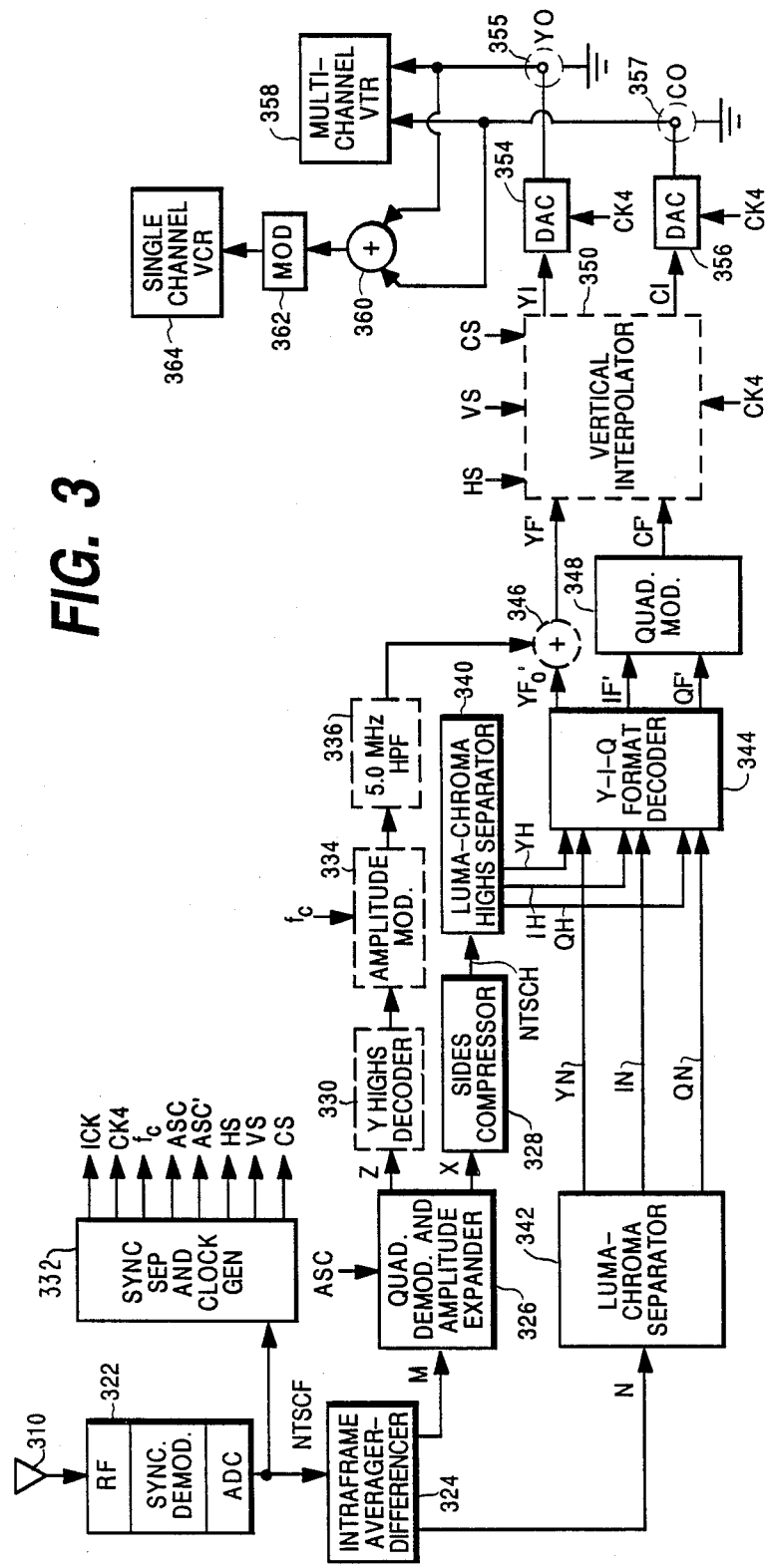
FIG. 3 is a block diagram of a decoding system which includes an embodiment of the present invention.

FIG. 3 is a block diagram of circuitry which includes an embodiment of the present invention. The circuitry shown in FIG. 3 partially decodes the encoded EDTV signal described above to generate, in one embodiment of the invention, a widescreen but not wideband television signal and in another embodiment of the invention, a widescreen wideband television signal. The signal produced by this circuitry may be displayed on a widescreen monitor or, with the addition of optional vertical interpolation circuitry 350, on a monitor having a standard aspect ratio. Alternatively, the signal may be recorded on conventional consumer VCRs 358 or 364. Although the decoding circuitry of FIG. 3 is shown as separate from the VCR, it is contemplated that the circuitry may be included in a consumer VCR as an alternative to conventional NTSC signal processing circuitry.

In FIG. 3, a broadcast compatible EDTV signal is received by an antenna 310 and applied to an input unit 322. The input unit 322 includes a radio frequency (RF) tuner and amplifier circuit, a synchronous video demodulator which extracts the in-phase modulation component of the received video signal, and an analog-to-digital converter (ADC). A signal NTSCF provided by the ADC of the input unit 322 represents the in-phase modulation component of the received EDTV signal to the relative exclusion of any quadrature phase modulation components (i.e. the first, second and third components of the EDTV signal to the relative exclusion of the fourth component).

The signal NTSCF is applied to synchronizing signal separation and clock signal generation circuitry 332. The circuitry 332 includes conventional circuitry which separates the horizontal and vertical synchronizing signals, HS and VS, respectively, from the signal NTSCF and combines the signals HS and VS to generate a composite synchronizing signal, CS. The circuitry 332 also includes a conventional phase locked loop (PLL) which generates a clock signal, CK4, having a frequency substantially equal to 4fsc, four times the frequency, fsc, of the color synchronizing burst signal component of the signal NTSCF. The circuitry 332 generates, from the signal CK4, a signal ICK having a frequency substantially equal to 2fsc and having negative-going transitions that are aligned with the I phase of the suppressed color subcarrier signal. The circuitry also generates, from the signal CK4, quadrature phase related alternate subcarrier signals, ASC and ASC', having a frequency substantially equal to 395 times one-half the horizontal line scanning frequency, and, optionally, a signal fc, having a frequency substantially equal to 5 MHz. The signals ASC, ASC' and fc may be generated, for example by incrementing a counter (not shown) with the signal CK4 and applying the counter value to a read only memory (ROM) (not shown) that is programmed to provide sample values representing the three signals.

Figure 4:
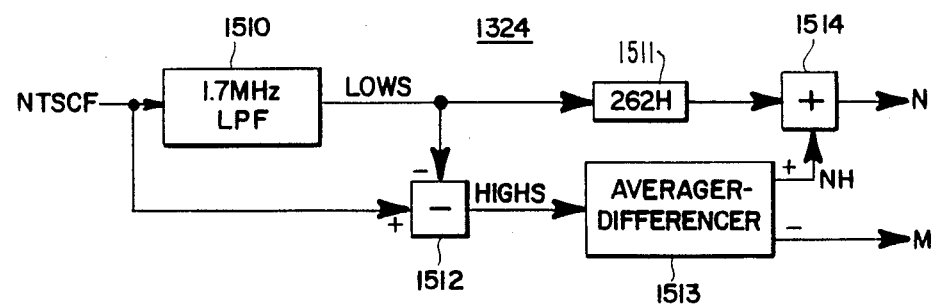
FIGS. 4 and 5 are block diagrams of an intraframe averager-differencer suitable for use in the decoding system shown in FIG. 3.
Figure 5:
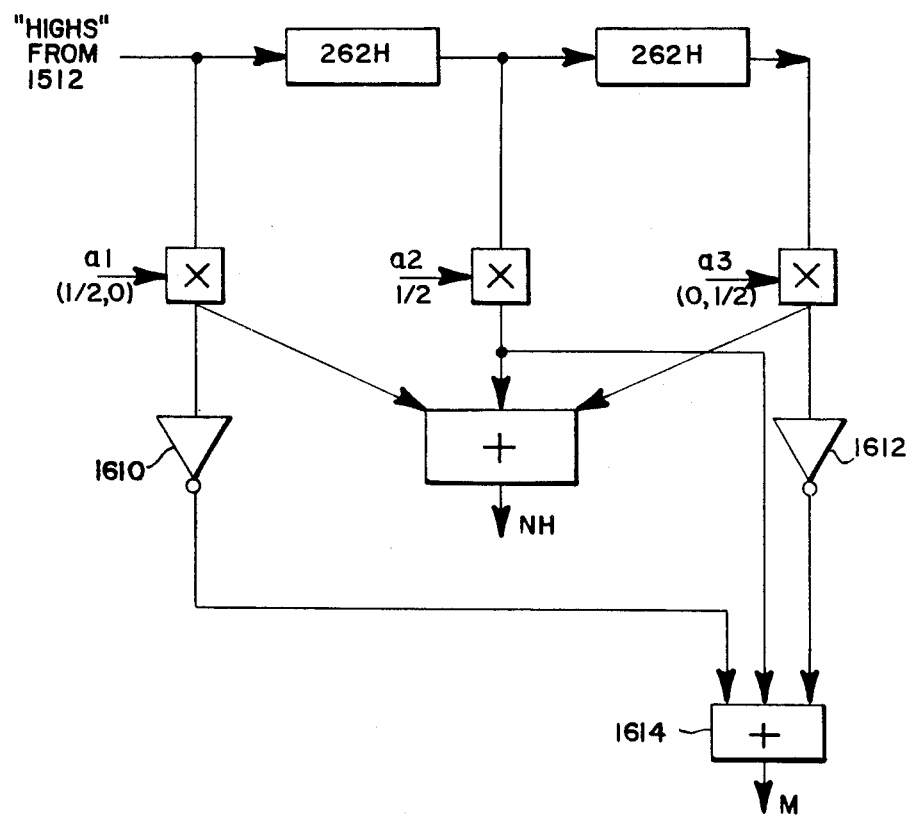

The signal NTSCF is also applied to intraframe averager-differencer circuitry 324. The circuitry 324 generates average pixel values and pixel difference values for corresponding pixel values in two fields which constitute a frame. The output signal N corresponds to the first component of the EDTV signal and the output signal M corresponds to the modulated second and third components of the EDTV signal. FIGS. 4 and 5 are block diagrams showing circuitry suitable for use as the intraframe averager-differencer 324.

In FIG. 4, the signal NTSCF is separated into low frequency components (LOWS) and high frequency components (HIGHS) by a 1.7 MHz low pass filter 1510 and a subtractor 1512. The HIGHS are applied to averager differencer circuitry 1513 which averages sample values of the signal HIGHS, from within a signal frame interval, that are separated by one field interval, to generate a signal NH. The circuitry 1513 also develops the signal M, which represents one-half of the difference between two samples of the signal HIGHS that are separated by one field interval in a single frame interval. Circuitry suitable for use as the averager-differencer 1513 is shown in FIG. 5. The signal NH provided by the circuitry 1513 is added, by an adder 1514, to the signal LOWS which has been delayed by one field interval (262H) via the compensating delay 1511. The output signal of the adder 1514 is the signal N.

Figure 6:
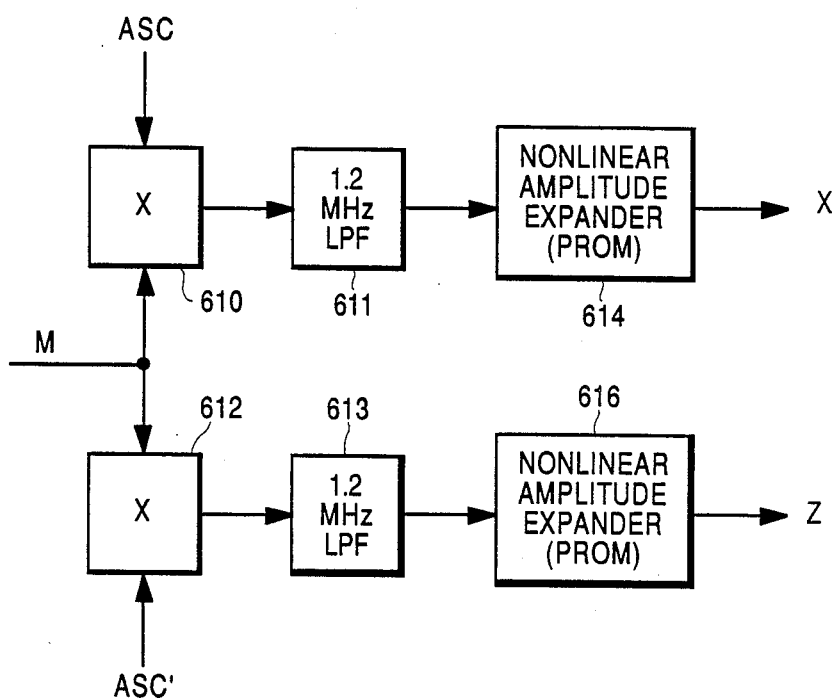
FIG. 6 is a block diagram of a quadrature demodulator and amplitude expander suitable for use in the decoding system shown in FIG. 3.

Referring to FIG. 3, the signal M provided by the circuitry 324 is applied to quadrature demodulator and amplitude expander circuitry 326. FIG. 6 is a block diagram of the circuitry 326.

In FIG. 6, the signal M is multiplied by the signals ASC and ASC' in respective multipliers 610 and 612. The output signals of the multipliers 610 and 612 are low-pass filtered to 1.2 MHz by the filters 611 and 613 and then applied to respective programmable read only memories (PROMs) 614 and 616. The PROMS 614 and 616 are programmed with an amplitude expansion function that is the inverse of an amplitude compression function that was used in the encoder to psycho-physically hide the second and third component signals in the compatible composite signal. The output signal, X, of the PROM 614 is the decoded second component signal, the expanded high frequency components of the side panel signals. The output signal, Z, of the PROM 616 is the decoded third component signal, the frequency shifted high frequency luminance signal components of the wideband widescreen EDTV signal. The signal Z may be processed further as described below in reference to an alternative embodiment of the present invention.

Referring to FIG. 3, the signal X is applied to side panel compressor circuitry 328 which effectively reverses the expansion of the side panel data performed by the encoder circuitry. This operation produces a signal NTSCH, which represents the high frequency components of the side panel signals, restored to their proper time relationship with a time compressed center panel signal developed by a Y-I-Q format encoder 344, described below in reference to FIG. 9. The compressor circuitry 328 is one application of a sample interpolator shown in FIGS. 10, 10a, 10b, and 10c.

Figure 10:
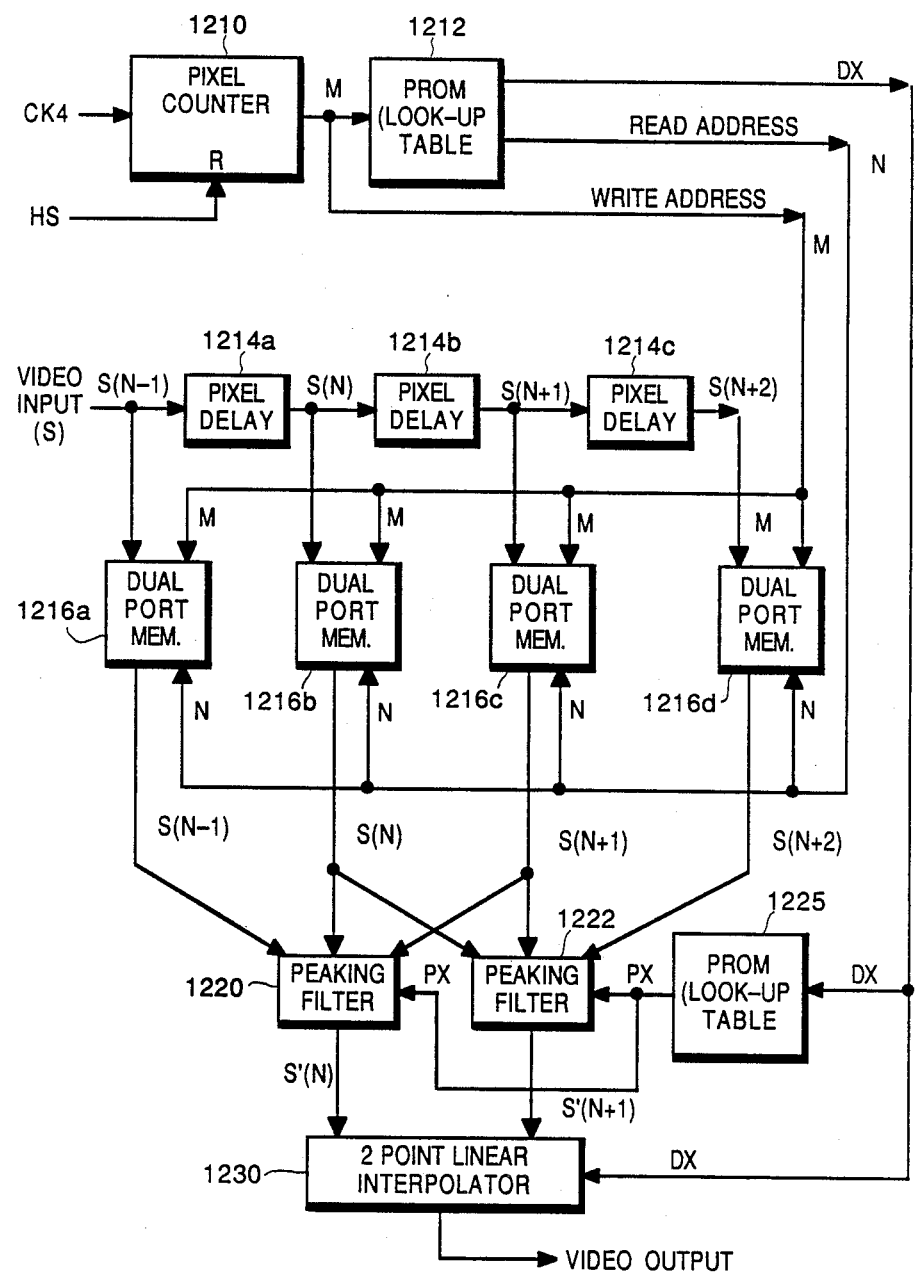
FIGS. 10, 10a and 10b are block diagrams of time expansion and compression circuitry suitable for use in the circuitry shown in FIGS. 3, 7 and 9.

In FIG. 10, sample values of a video input signal, designated S in the Figure, which may be, for example, the signal X, are applied to three serially connected delay elements, 1214a through 1214c. Each of the delay elements delays sample values applied to its input port by one period of the clock signal CK4. The input video signal and the output signals of each of the delay elements 1214a through 1214c are applied to respective dual port memories 1216a through 1216d. The sample values are written into each of the memories as they are received using address values provided by a pixel counter 1210. The counter 1210 is reset by the horizontal line synchronizing signal, HS, and incremented by the signal CK4. The signal provided by the counter 1210 is applied to a PROM 1212 which generates a read address value for the memories 1216 and an interpolation factor DX. The sample values stored in the memories 1216 are provided in parallel to two peaking filters 1220 and 1222. The filters 1220 and 1222 amplify the high frequency components of the sampled data signals provided by the memories 1216, relative to the low frequency components, by an amount, PX, that is derived from the interpolation factor DC according to a functional relationship stored in a PROM 1225. The peaked sampled data signals, S'(N) and S'(N+1), are applied to a two-point linear interpolator 1230. The interpolator 1230 weights samples of the signal S'(N+1) and S'(N) by DX and 1-DX, respectively, and sums the weighted sample values to produce the interpolated output signal. The peaking filters 1220 and 1222 compensate for high frequency roll-off in the interpolator 1230.

Figure 10A:
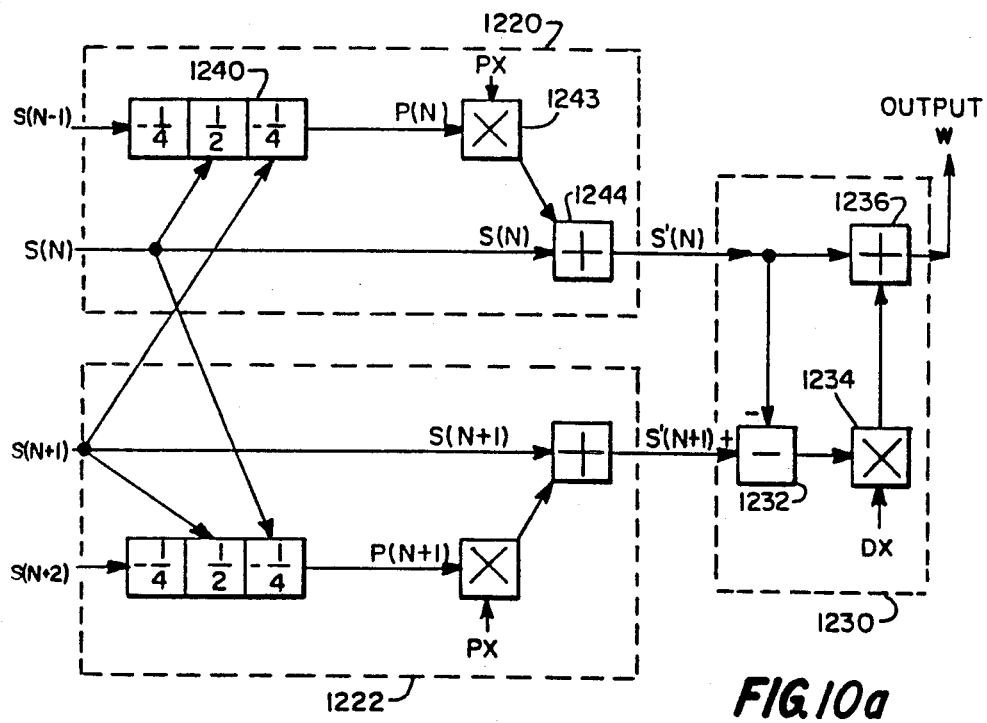
Figure 10B:
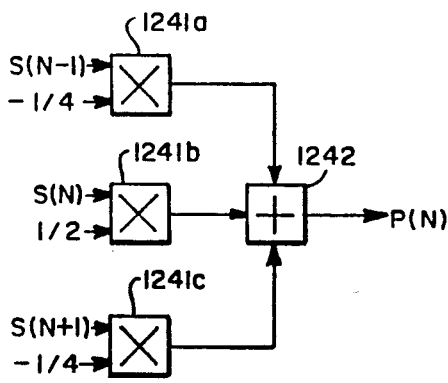
Figure 10C:
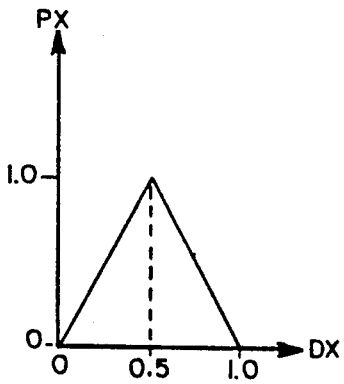
FIG. 10c is a diagram showing the relative amplitudes of two signals which are useful for explaining the operation of the circuitry shown in FIGS. 10, 10a and 10b.

FIG. 10a shows more detail of the peaking filters 1220 and 1222 and the interpolator 1230. FIG. 10b is a block diagram showing the structure of a finite impulse response (FIR) filter 1240 which is a part of the peaking filter 1220. FIG. 10c is a graphical representation of the function stored in the PROM 1225 which generates the peaking factor, PX, from the interpolation factor DX.

As set forth above, the circuitry shown in FIGS. 10 through 10c may be used for a variety of sample value interpolation operations. It may be used to compress the signal X to align the high frequency components of the side panel signals to the side panel pixel values produced by the format encoder 344. It may also be used, as set forth below in reference to the format encoder 344, to process the first component of the EDTV signal to expand the low frequency components of the side panel signals. The type of function performed by the interpolation circuitry is determined by the programming of the PROM 1212. If the read address value provided by the PROM 1212 increases more rapidly than the write address value applied to its address input port, the interpolator circuitry will perform a compression function. If, on the other hand, the read address increases more slowly than the write address value then the interpolator will perform an expansion function. Whether the interpolator performs an expansion function or a compression function and the value of the expansion or compression factor used are determined by the programming of the PROM 1212. One skilled in the art of digital signal processing circuit design would be able to program the PROM 1212 for a particular expansion or compression function.

Referring to FIG. 3, the signal NTSCH is developed from the expanded side panel data in the second component signal, X, of the EDTV signal using a compression factor of 4.49. The signal NTSCH is applied to luminance-chrominance separation circuitry 340 which separates the luminance (YH) and chrominance components of the signal NTSCH and demodulates the chrominance signal component to obtain two color difference signal components (IH and QH). The signals YH, IH and QH are applied to the Y-I-Q format encoder 344 along with signals YN, IN and QN developed from the first component signal, N, by luminance-chrominance separation circuitry 342. The circuitry used for the luminance-chrominance separators 340 and 342 may be identical; exemplary circuitry is shown in FIG. 8.

Figure 8:
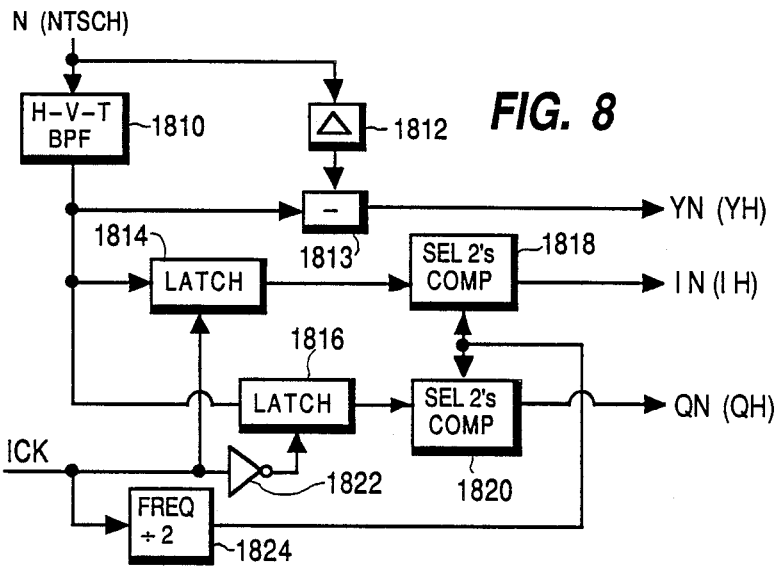
FIG. 8 is a block diagram of a luminance/chrominance signal separator and chrominance signal demodulator suitable for use in the decoding system shown in FIG. 3.

In FIG. 8, the signal N or the signal NTSCH is applied to a band-pass filter 1810 and to a delay element 1812 which compensates for the processing delay through the filter 1810. The filter 1810 used in this embodiment of the invention is a horizontal-vertical-temporal (H-V-T) band-pass filter such as that described in the above-referenced Isnardi application. This filter includes a combination of delay elements which delay the signal applied to its input port by a number of sample times, by a number of horizontal line periods and by a number of field periods and circuitry to weight and combine the delayed samples to produce a filtered chrominance signal. Alternatively, the filter may be realized by combining a conventional chrominance signal band-pass filter, a conventional line comb filter and a conventional frame comb filter in cascade. The output signal of the filter 1810 is a separated chrominance signal. This signal is applied to the subtrahend input port of a subtractor 1813, the minuend input port of which is coupled to receive the signal provided by the compensating delay element 1812. The output signal of the subcontractor 1813 is the luminance component signal, YN or YH.

The chrominance signal developed by the filter 1810 may be represented as a sequence of sample values, I, Q, -I, -Q, I, Q etc. where I and Q indicate samples of the I and Q color difference signals, and the signs of the samples indicate sampling phase, not necessarily sample polarity. This chrominance signal is applied to first and second latches 1814 and 1816. The latch 1814 is responsive to the I-phase clock signal, ICK, provided by the clock generation circuitry 332 of FIG. 3, to hold sample values of the chrominance signal that represent the I color difference signal component of the chrominance signal. The latch 1816 is responsive to an inverted version of the signal ICK, provided by an inverter 1822, to hold sample values representing the Q color difference signal component of the chrominance signal. The output signals provided by the latches 1814 and 1816 are applied to respective twos complementing circuits 1818 and 1820. The circuits 1818 and 1820 are controlled by a signal provided by a frequency divider 1824 to complement alternate ones of the sampled data I and Q color difference signals. The signals provided by the circuits 1818 and 1820 are the demodulated signals IN or IH and QN or QH, respectively.

Figure 9:
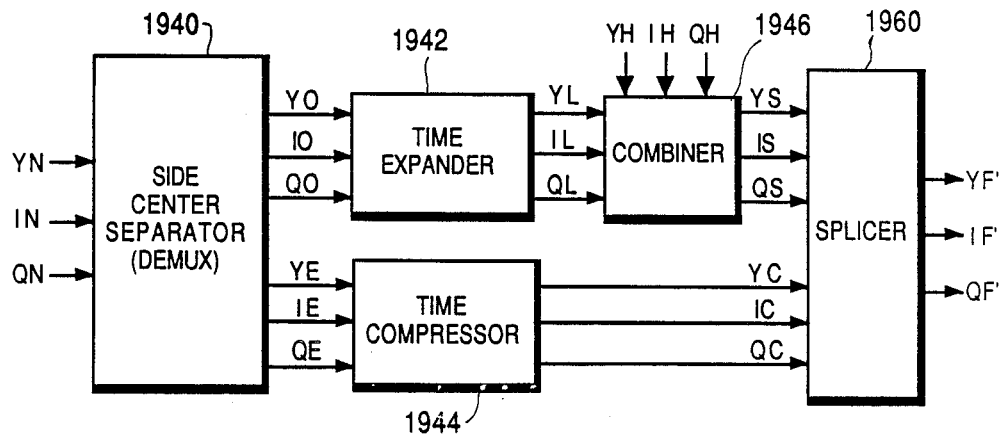
FIG. 9 is a block diagram of a YIQ format encoder suitable for use in the decoding system shown in FIG. 3.

As set forth above, the signals YH, YN, IH, IN, QH and QN are applied to a Y-I-Q format encoder 344 where they are combined to form widescreen signals $YF'_0$, $IF'$ and $QF'$. Exemplary circuitry which may be used as the format encoder 344 is shown in FIG. 9. In FIG. 9, the first component luminance and color difference signals, YN, IN and QN, are applied to side panel—center panel separator circuitry 1940. The circuitry 1940, which may, for example, include a demultiplexer (not shown) and a pixel counter (not shown) separates pixel values on each line that represent the low frequency components of the side panel signals from the samples that represent the center panel signal. In this embodiment of the invention, samples 1–14 and 741 to 754 from each horizontal line represent the side panel signal while samples 15 to 740 of each horizontal line represent the center panel signal.

The circuitry 1940 provides sampled data signals, Y0, I0, and Q0, representing the compressed side panels. These samples are applied to a time expander 1942 that expands the signal in time by a factor of 6 to produce signals YL, IL and QL. These signals represent the low frequency components of the side panel signals, restored to their original widescreen time relationship. The signals YL, IL and QL are added in combiner circuitry 1946 to the signals YH, IH and QH from separator 340 to generate restored widescreen side panel signals YS, IS and QS.

The circuitry 1940 also provides sampled data signals YE, IE, and QE which represent the time-expanded center panel portion of the first component of the EDTV signal. These signals are applied to a time compressor 1944 which compresses the sampled data signals in time by a factor of 0.81 to generate restored widescreen center panel signals YC, IC and QC.

Figure 11:
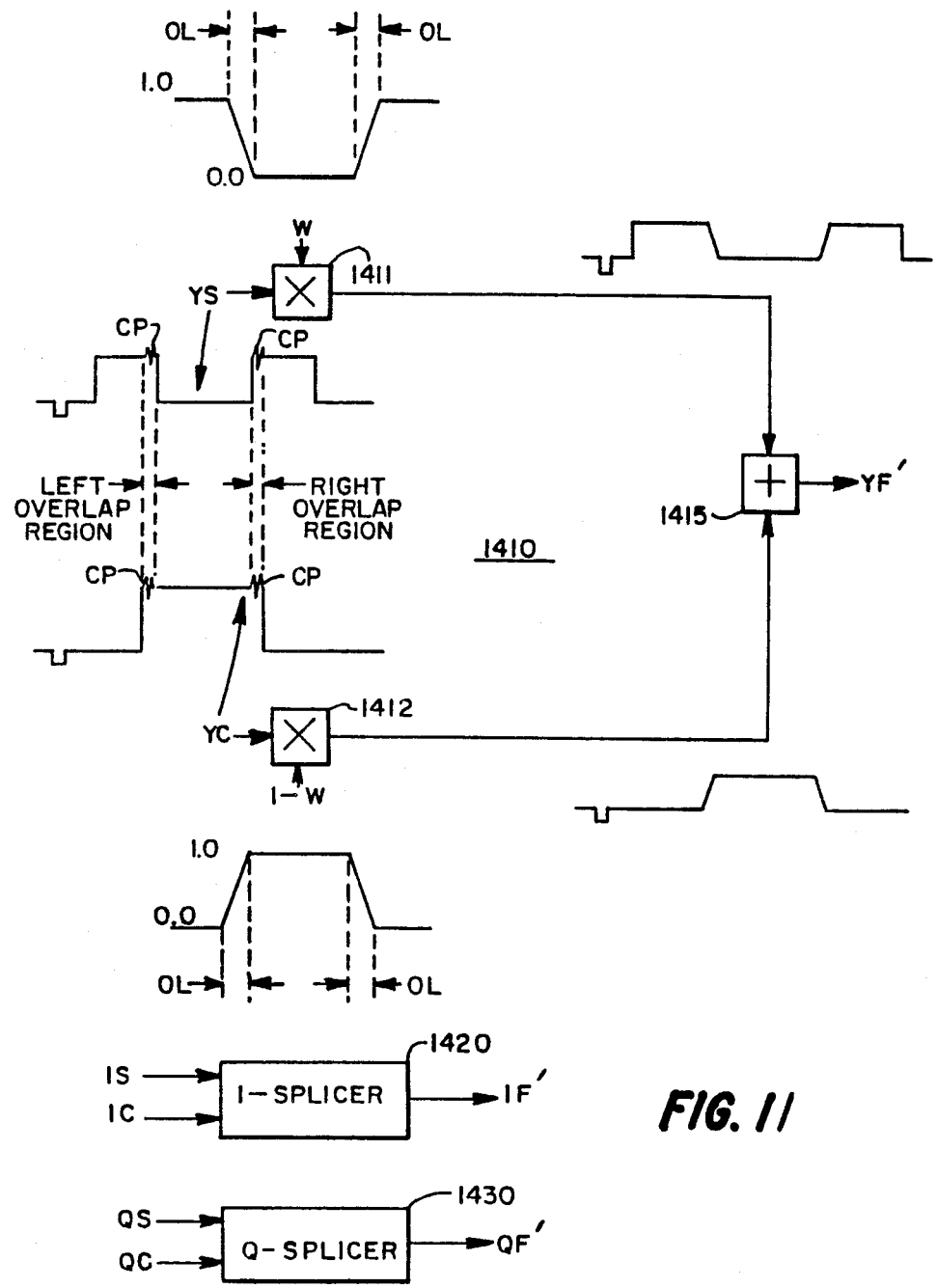
FIG. 11 is a block diagram and waveform diagrams which illustrate splicer circuitry suitable for use in the circuitry shown in FIG. 9.

The restored side and center panel signals are recombined by a splicer 1960 to generate the complete widescreen luminance and color difference signals. Circuitry suitable for use as the splicer 1960 is shown in FIG. 11. In FIG. 11, the splicer is shown as including a network 1410 for splicing the luminance center panel and side panel signals, YC and YS, respectively to generate the widescreen luminance signal, $YF'_0$. In addition, FIG. 11 shows an I signal splicer 1420 and a Q signal splicer 1430 which have the same structure and operation as the illustrated Y signal splicer.

In the encoding operation, the center panel and side panel signals are purposely overlapped by, for example, ten samples to compensate for corruption of sample values at the boundaries of the side and center panel regions. This corruption which may occur in the expansion and compression processes. If the panels did not have an overlap region, the potentially corrupted samples would be abutted against each other and a seam would be visible in the reproduced image. An overlap region of ten samples has been found sufficient to compensate for up to five corrupted sample values.

In FIG. 11, a multiplier 1411 multiplies the side panel signal YS by a weighting function W in the overlap regions, as illustrated by the associated waveform, before signal YS is applied to an adder 1415. Similarly, a multiplier 1412 multiplies the center panel signal YC by a complementary weighting function (1-W) in the overlap regions, as illustrated by its associated waveform, before the signal YC is applied to the adder 1415. These weighting functions exhibit a linear ramp-type characteristic over the overlap regions and have values between 0 and 1. They may be realized, for example by a combination of a sample counter (not shown) which addresses a ROM containing sample values representing the weighting functions. The output signal of the adder 1415 is the spliced widescreen luminance signal $YF'_0$.

Referring to FIG. 3, in a first embodiment of the invention, the signal $YF'_0$ is presumed to be applied directly to a digital to analog converter (DAC) 354 which is responsive to the clock signal CK4 for producing a widescreen luminance signal Y0 at an output terminal 355 and, to the luminance input terminal of a conventional multi-channel VCR 358. The luminance signal Y0 has a bandwidth of 5 MHz. This approximately conforms to the 4.2 MHz bandwidth of an NTSC luminance signal. The widescreen signals IF' and QF' in this first embodiment of the invention are applied to a conventional quadrature modulator 348 which generates a sampled data widescreen chrominance signal, CF'.

Figure 12:
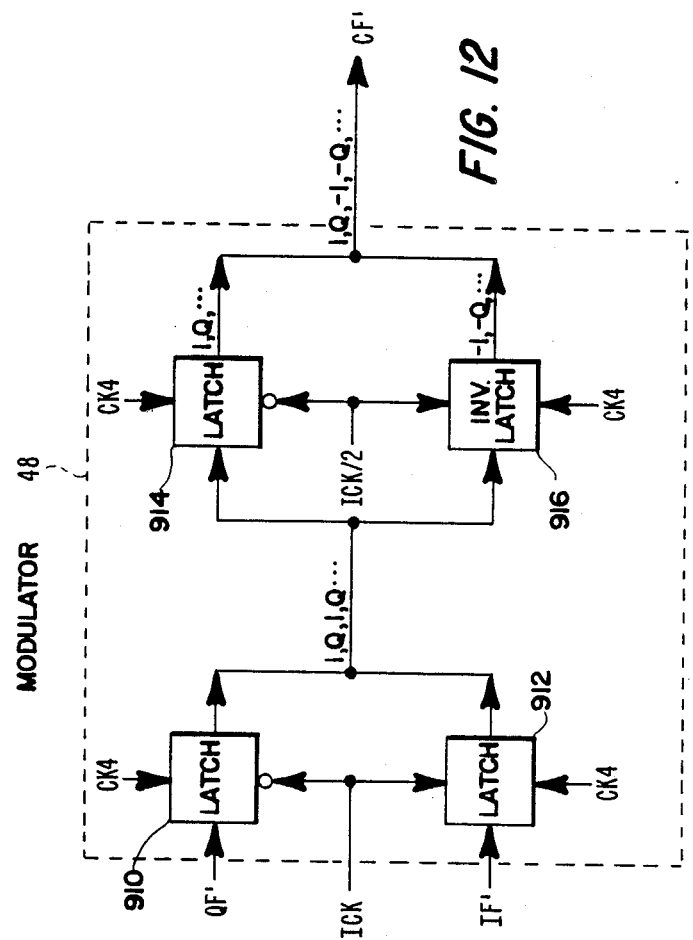
FIG. 12 is a block diagram showing a quadrature modulator suitable for use in the system shown in FIG. 3.

Circuitry suitable for use as the modulator 348 is shown in FIG. 12. In FIG. 12, the circles at the clock signal input terminals of latches 910 and 914 indicate that these latches are responsive to the complement of the clock signal ICK. An inverting latch 916 includes a twos complementer in its output circuitry to provide a complemented version of its latched value as its output value. The operation of the circuitry shown in FIG. 12 is the inverse of that of the demodulator described above in reference to FIG. 8.

The signal CF' provided by the modulator 348 is presumed to be applied directly to a DAC 356 which operates in the same manner as the DAC 354 to provide an analog wideband chrominance signal, C0, at an output terminal 357 and to the chrominance signal input terminal of the conventional multi-channel VCR 358. As used in this application, the term multi-channel VCR means a VCR which accepts component signals for recording and which provides the component signals as output signals during playback. The currently available S-VHS and ED-Beta VCR are examples of multi-channel VCR's.

The signals Y0 and C0 may be displayed directly on a widescreen monitor or recorded, using the VCR, and played back on a widescreen monitor. The image produced on the widescreen monitor may be of lesser quality than the image produced on an EDTV receiver such as that shown in FIG. 15, described below, since the circuitry shown in FIG. 3 ignores the third and fourth components of the EDTV signal, which, respectively, include high frequency luminance information, and information which helps the EDTV receiver to generate a high quality progressive scan image. The third and fourth components of the EDTV signal are not used by the circuitry shown in FIG. 3 because the information conveyed by these components currently cannot be recorded on currently available S-VHS or ED-Beta VCRs.

However, the information conveyed by the third component signal, the high frequency luminance detail, can be displayed on a widescreen monitor. Consequently, a first alternative embodiment of the circuitry shown in FIG. 3, which is described is an embodiment in which the circuit elements 330, 334, 336 and 346 are included to decode the third component and add it to the luminance signal $YF'_0$ to produce a wideband widescreen luminance signal YF'.

Figure 7:
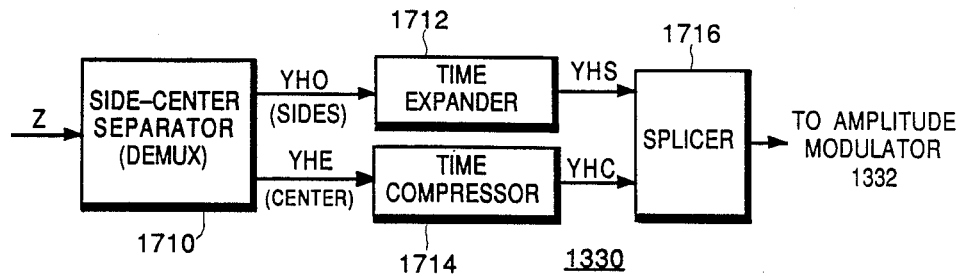
FIG. 7 is a block diagram of a luminance high frequency signal decoder suitable for use in an alternative embodiment of the system shown in FIG. 3.

The circuit element 330 is a decoder which recovers the frequency-shifted luminance signal high frequency components from the signal Z, provided by the quadrature demodulator and amplitude expander circuitry 326. Exemplary circuitry for use as the decoder 330 is shown in FIG. 7. In FIG. 7, the signal Z is applied to a side panel, center panel separator 1710, which may operate in the same manner as the separator 1940, described above in reference to FIG. 9. The separator 1710 separates samples, YHO, representing high frequency components of the side panel signals from samples, YHE, representing the center panel signal. The samples YHO and YHC are applied, respectively, to time expander circuitry 1712, and time compressor circuitry 1714, which may operate in the same manner as the respective circuitry 1942 and 1944 described above in reference to FIG. 9. The signals YHS and YHC, generated by the expander and compressor circuitry 1712 and 1714, respectively, are applied to a splicer 1716 which may be the same as the splicer 1960 described above in reference to FIG. 9.

Referring to FIG. 3, the signal provided by the decoder 330 is applied to an amplitude modulator 334. The modulator 334 multiplies the signal provided by the decoder 330 by the 5 MHz signal, fc, provided by the clock generation circuitry 332 to restore the high frequency luminance signal to its original band of frequencies. The high frequency luminance signal provided by the modulator 334 is applied to a high-pass filter 336 which blocks frequencies less than 5 MHz. This filter removes the baseband component of the signal provided by the modulator 334. The output signal of the high-pass filter 336 is applied to one input terminal of an adder 346, the other input terminal of which is coupled to receive the signal $YF'_0$. The adder 346 combines the high frequency components of the luminance signal (between 5.0 MHz and 6.2 MHz) with the widescreen luminance signal $YF'_0$ to generate a wideband widescreen luminance signal YF'.

In this alternative embodiment of the invention, the wideband widescreen luminance signal, YF' is applied to the DAC 354 to generate an analog wideband widescreen luminance output signal as the signal Y0. This signal may be used with the signal C0 to produce a high definition widescreen picture on a wideband widescreen monitor. Although, at present, there are no consumer VCRs which have sufficient bandwidth to record the wideband signal, it is contemplated that, if one is developed, the wideband signal may be recorded in component form using either Y and C or R, G, and B signals.

A second alternative embodiment of the invention includes vertical interpolation circuitry 350 which compresses the widescreen luminance and chrominance signals to generate widescreen signals that produce a normally proportioned image on a monitor having a conventional 4:3 aspect ratio. The signals produced by the system without the vertical interpolator may be displaced on a 4:3 monitor, but the image produced would appear vertically stretched.

Figure 13:
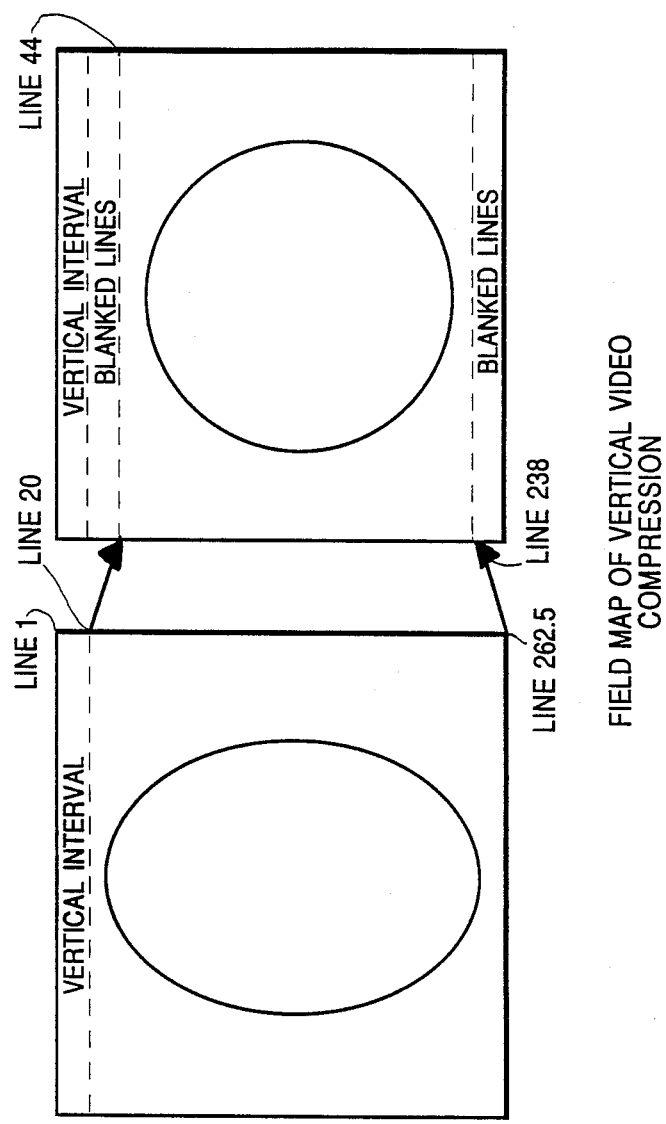
FIG. 13 is a diagram useful for explaining the operation of the vertical interpolation circuitry shown in FIG. 3.

FIG. 13 illustrates the vertical compression operation performed by the vertical interpolator 350. The block on the left of FIG. 13 represents a field of one of the signals applied to the interpolator 350 and the block on the right represents the same field after it has been processed by the interpolator 350. As illustrated by FIG. 13, the interpolator maps the vertically stretched information in the widescreen image, as it would be displayed on a standard monitor, into a normally proportioned image. The vertically compressed image includes blanked areas above and below the active image area.

Figure 14:
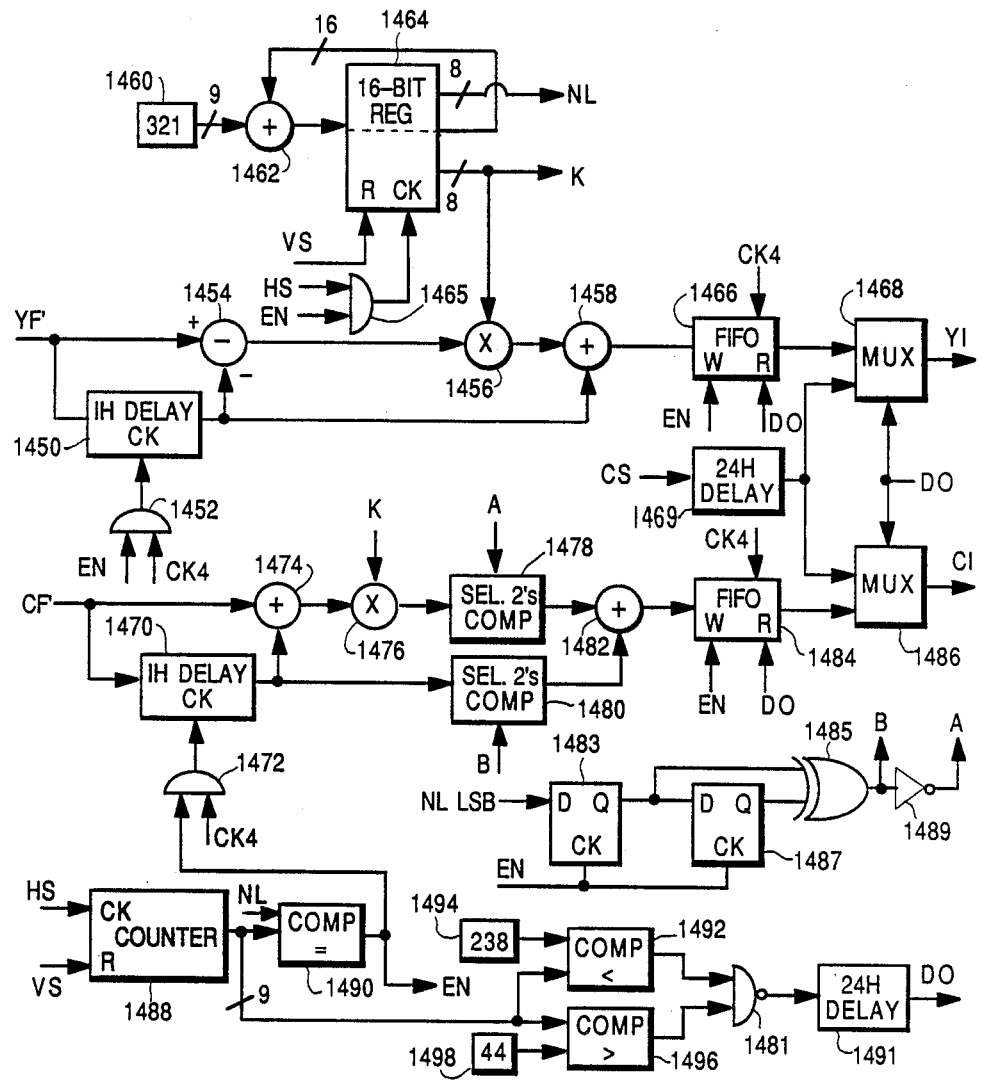
FIG. 14 is a block diagram showing circuitry suitable for use as the vertical interpolation circuitry of FIG. 3.

FIG. 14 is a block diagram of circuitry suitable for use as the vertical interpolator 350. In FIG. 14, the luminance signal YF' is applied to an input port of a one horizontal line period (1H) delay element 1450 and to a subtractor 1454. The subtractor 1454 subtracts samples provided by the 1H delay element from samples of the signal YF' and applies the sample difference values to a multiplier 1456. The multiplier 1456 is coupled to receive an interpolation factor from the eight least significant bit (LSB) positions of an accumulator register 1464. The scaled sample values provided by the multiplier 1456 are added to the sample values provided by the 1H delay 1450 to generate interpolated sample values.

The register 1464 and added 1462 form an accumulator which determines which of the input lines are to be averaged to produce the line of interpolated output samples, and what interpolating factor is to be used. The register 1464 provides a 16-bit value to one input port of an adder 1462. The other input port of the adder 1462 is coupled to a digital value source 1460. The register 1464 is loaded synchronous with a loading signal that is the logical AND of the enabling signal, EN, and horizontal synchronization signal, HS. The register 1464 is reset by the vertical synchronization signal, VS. For each pulse of the loading signal, the adder 1462 adds a value, 321, to the value held in the accumulator register 1464, and then stores the result in the register 1464. The eight most significant bits (MSBs) of the value held in the accumulator are the line number, NL, relative to the vertical synchronization pulse, of the next line to be used by the interpolator. The eight LSBs of the accumulator value are the scale factor, K, to be used to generate the interpolated line from the line of samples currently being applied to the interpolator and the line of samples stored in the 1H delay 1450. In this configuration, the interpolator compresses the lines of samples applied to its input port by a factor of 256/321 or 0.80.

The line number signal, NL, provided by the register 1464 is applied to one input port of a comparator 1490, the other input port of which is coupled to receive a value provided by a counter 1488. The counter 1488 is reset by the signal VS and incremented by the signal HS and, so, holds the line number, relative to the vertical synchronization pulse of the line of samples currently applied to the interpolator circuitry 350. The comparator 1490 is configured to produce a logic-one signal when the signal NL is equal to the value provided by the counter 1488 and to provide a logic-zero otherwise. The output signal of the comparator 1490 is the signal EN.

Responsive to the signals EN and CK4, the 1H delay element 1450 loads a new line of samples. Responsive to the signals EN and HS, the accumulator 1464 increments its value by 321 to indicate the next line of input samples to be loaded into the 1H delay element 1450 and to indicate the factor to be used to interpolate the next line of output samples.

The interpolated sample values provided by the adder 1458 are applied to the input port of a first-in-first-out (FIFO) memory 1466. The FIFO 1466 desirably has a sufficient number of storage cells to hold samples representing 40 lines of interpolated signal, corresponding to the 40 lines of samples generated during the first and last 24 active line intervals of each field of the input signal. The output signal is blanked during these 48 line intervals. The FIFO 1466 is conditioned, by the signals EN and CK4, to write samples provided by the adder 1458. The FIFO 1466 is conditioned to provide stored samples at its output port responsive to the signal CK4 and to a signal D0.

The signal D0 is generated by circuitry which includes digital value sources 1494 and 1498, comparators 1492 and 1496, a NAND gate 1481 and a 24H delay element 1491. The signal D0 is in a logic-one state when the line number value provided by the counter 1488 is between 44 and 238 and is in a logic-zero state otherwise. Thus, the FIFO 1466 is conditioned to provide lines of samples only during the unblanked active field interval of the vertically compressed signal. The signal D0 is delayed by 24 horizontal line periods by the delay element 1491 to allow the lines at the end of a field to be interpolated before they are provided as output signal.

The sample values provided by the FIFO 1466 are applied to one input port of a multiplexer 1468, the other input port of which is coupled to receive the composite synchronization signal, CS, provided by the circuitry 332 of FIG. 3 via a 24H delay element 1469. The multiplexer 1468 is controlled by the signal D0 to provide the interpolated lines of samples from the FIFO 1466 during lines 44–238 of each field interval and to provide the composite synchronizing signal otherwise. This effectively blanks the lines 20–43 and 238–262 of each field.

The circuitry which interpolates the chrominance signal, CF', is similar to that described above for the luminance signal, YF'. The chrominance signal interpolation circuitry is different only because it must accommodate for the 180° phase shift between successive lines of the interpolated signal. Since the interpolator does not use every line of input samples to generate lines of output samples, it is possible that the two lines used in the interpolation may have the same or opposite phases. To ensure that the interpolation circuitry always generates correctly phased chrominance signals, the chrominance interpolation circuitry includes an adder 1474, corresponding to the subtractor 1454, and includes selective twos complementing circuits 1478 and 1480 coupled to the input ports of an adder 1482 corresponding to the adder 1458. The circuits 1478 and 1480 selectively change the polarity of samples applied to their input ports in response to respective control signals A and B.

The control signals A and B are generated by circuitry which includes two data-type (D) flip-flops 1483 and 1487, and exclusive-or gate 1485 and an inverter 1489. The two flip-flops are configured as a two-bit shift register that is clocked by the signal EN and that has the LSB of the signal NL as its input signal. The output signals of the flip-flops 1483 and 1487 indicate the relative chrominance signal phases of the line of samples held in the 1H delay line 1470 and the line of samples currently being received. If the chrominance phases are different, the signal B is a logic-one and the signal A is a logic-zero. If the chrominance phases are the same, the signal A is a logic-one and the signal B is a logic-zero. When either of the control signals A or B is a logic-one, the corresponding twos complementing circuit 1483 or 1487 complements values applied to its input port, otherwise, it passes the values unchanged. The remainder of the circuitry in the chrominance interpolator operates identically to corresponding circuitry in the luminance interpolator.

Referring to FIG. 3, the signals YI and CI provided by the vertical interpolation circuitry 350 represent a widescreen image that has been vertically compressed so that it will produce a properly proportioned 5:3 image on a conventional 4:3 display device. These signals are converted to the analog signals Y0 and C0 by the DACs 354 and 356 as set forth above. The signals Y0 and C0 may be applied to a conventional 4:3 monitor, recorded on a conventional multi-channel VCR. The signals Y0 and C0 may also be combined by, for example, a summing network 360 to generate a composite video signal. This composite video signal may be applied to a composite video input terminal of a conventional single channel VCR, or modulated by a modulator 362 to generate an RF television signal which is applied to an RF input terminal of the single channel VCR. As used herein, the term single-channel VCR means a VCR which accepts only a composite video input signal, such as a conventional VHS or Beta machine.

The circuitry set forth above provides several methods of processing an encoded wideband widescreen television signal to generate a widescreen and, in one instance, a wideband signal that is compatible with existing recording and display apparatus. However, some of the signals described above will only produce a properly proportioned display on a widescreen monitor.

Figure 15:
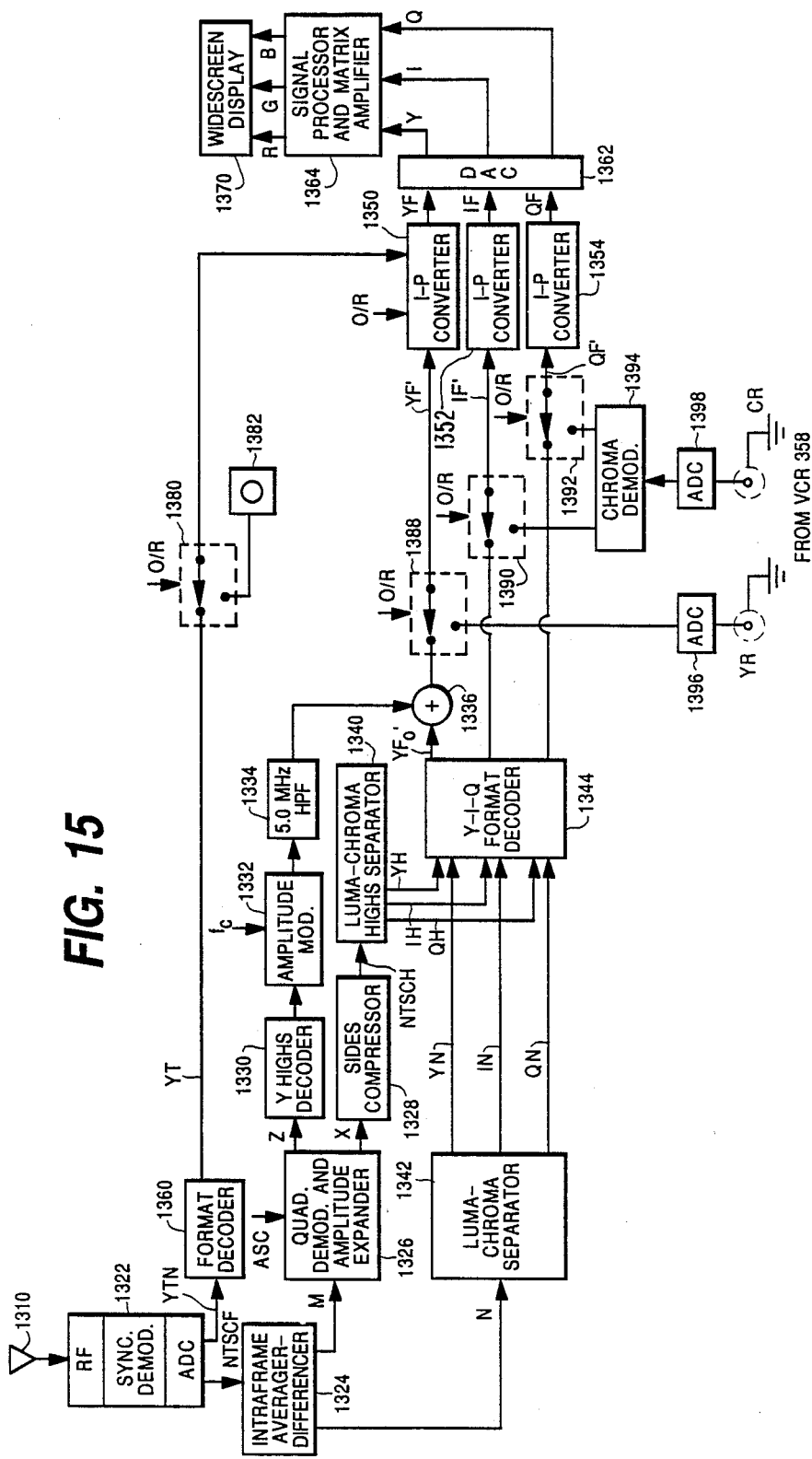
FIG. 15 is a block diagram of a portion of an EDTV receiver including a decoding system and circuitry for displaying externally applied wideband widescreen luminance and chrominance signals.

FIG. 15 is a block diagram of a modification of the EDTV receiver circuitry described in the above-referenced Isnardi application. This modification allows the EDTV receiver to be used as a wideband widescreen monitor for displaying images developed from component luminance and chrominance signals. The circuitry shown in FIG. 15 includes an EDTV decoder that is similar to the one described above in reference to FIG. 3. The decoder of FIG. 15 differs from that shown in FIG. 3 because the input unit 1322 includes a synchronous detector and ADC which recover the quadrature phase modulation component of the RF video signal, i.e. the fourth component of the EDTV signal, YTN, and a format decoder 1360 which reverses the mapping operation that was used to psycho-physically hide the fourth component signal in the compatible composite signal. The circuitry shown in FIG. 15 also includes interlace scan to progressive scan converters 1350, 1352 and 1354 for the luminance and color difference signals provided by a Y-I-Q format encoder 1344, a DAC 1362, signal processing circuitry 1364 and display apparatus 1370.

The EDTV receiver is converted to an EDTV monitor by switches 1388, 1390, and 1392 inserted in the respective luminance and I and Q color difference signal paths from the format decoder 1344 to the respective interlace to progressive scan converters 1350, 1352 and 1354, and by a switch 1380 in the signal path between the format decoder 1360 for the fourth component V-T helper signal, YT, and the interlace to progressive scan converter 1350. In addition to the above, the converter 1350 is modified to compensate for the lack of a V-T helper signal when the EDTV receiver is used as a monitor.

The switches 1388, 1390 and 1392 are controlled by a signal O/R, which may be provided through an external mode switch (not shown) on the receiver, to pass luminance and color difference signals provided by the format encoder 1344 or to pass a luminance signal provided from an input terminal, YR, by an ADC 1396 and I and Q color difference signals provided from an input terminal, CR, by an ADC 1398 and a conventional chrominance signal demodulator 1394. The switch 1380 is conditioned by the signal O/R to provide either the decoded fourth component signal, YT, or a zero value from a digital value source 1382.

Figure 16:
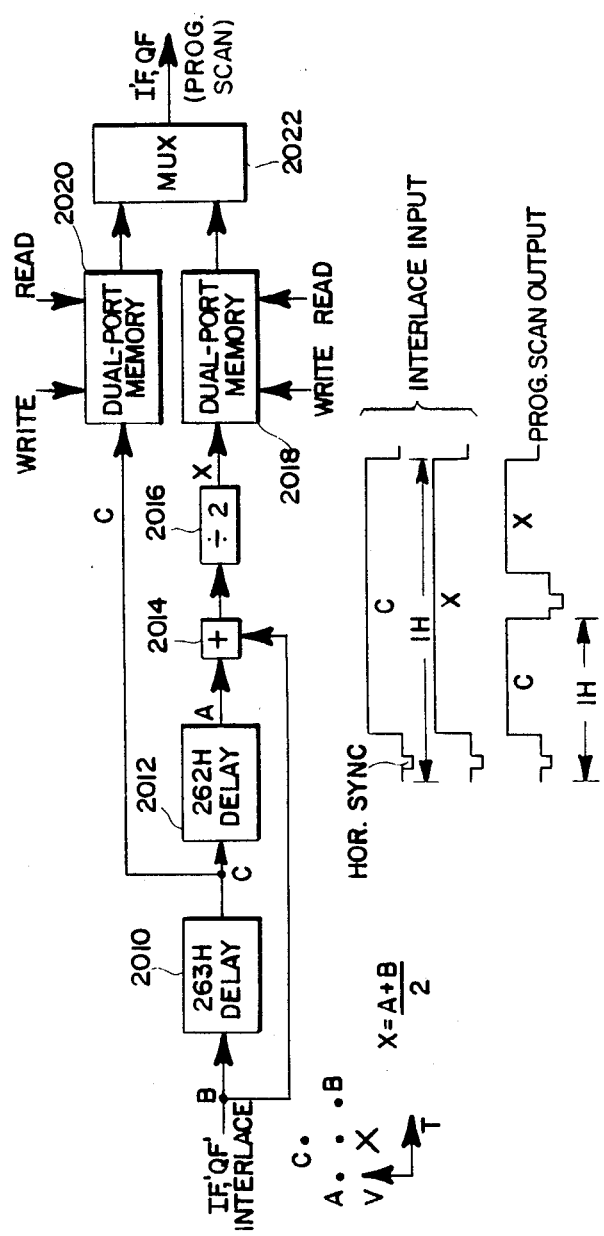
FIG. 16 is a block diagram of a chrominance signal interlace to progressive scan converter suitable for use in the portion of the EDTV receiver shown in FIG. 15.

The signals IF' and QF', provided by the respective switches 1390 and 1392, are processed by the interlace to progressive scan converters 1352 and 1354 in the same manner whether they originate from the decoder or from an external source. FIG. 16 is a block diagram of an interlace to progressive scan converter suitable for use as either of the converters 1352 or 1354. In FIG. 16, the interlace signals IF' (or QF') are delayed 263H by an element 2010 before being applied to an input port of a dual port memory 2020. This delayed signal is subjected to an additional 262H delay by an element 2012 before being added with the input signal in an adder 2014. The output signal from the adder 2014 is coupled to a divide-by-two network 2016. The output signal of the network 2016 is applied to an input port of a dual port memory 2018. Memories 2020 and 2018 write data at a 4fsc rate and read data at an 8fsc rate. The output signals provided by the memories 2018 and 2020 are applied to a multiplexer 2022 which produces an output progressive scan signal, IF (QF). Also shown in FIG. 16 are waveforms which illustrate the interlace scan input signal (two lines, with pixel samples C and X designated) and a progressive scan output signal which includes the samples C and X.

Figure 17:
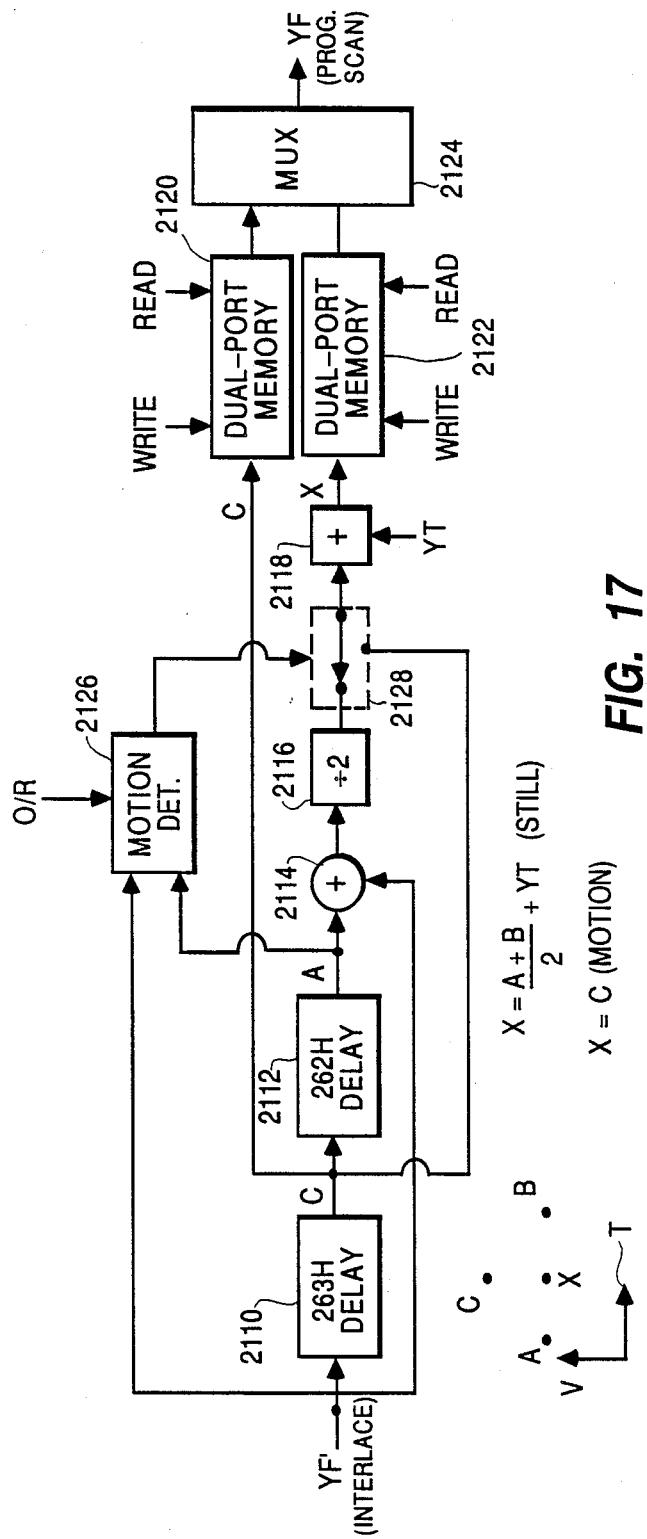
FIG. 17 is a block diagram of a luminance signal interlace to progressive scan converter suitable for use in the portion of the EDTV receiver shown in FIG. 15.

FIG. 17 is a block diagram of circuitry suitable for use as the luminance signal interlace to progressive scan converter 1350. The circuitry shown in FIG. 17 operates in two modes. When the signal O/R indicates that the luminance input signal, YF', is provided by the decoder, the circuitry in FIG. 17 operates in the same manner as that shown in FIG. 16 except that the fourth component V-T helper signal is added to the frame averaged signal provided by a divider 2116 to provide an input signal for a dual port memory 2122. However, when the signal O/R indicates that the signal YF' is provided from the external input terminal, YR, the circuitry shown in FIG. 17 switches between operating identically to the circuitry shown in FIG. 16 when a still image is being displayed and operating as a line-repeat interlace to progressive scan converter when a moving image is displayed. This change in operational mode is implemented by the addition of a conventional interframe motion detector 2126 and a switch 2128.

The motion detector 2126 is responsive to the signal O/R to be active only when the luminance signal YF' is from the input terminal YR. The detector 2126 compares corresponding pixel values separated by one frame interval. If the pixel values are substantially equal, then there is no motion in the image at the pixel position and, so, the switch 2128 is conditioned to pass the output signal of the divider 2116 to the input port of the memory 2122. If the detector 2126 finds a significant difference between the pixel values, it conditions the switch 2122 to apply the same signal to the memory 2122 as is applied to the memory 2120. The samples provided by the output multiplexer 2124 of the luminance signal interlace to progressive scan converter are frame averaged signals for still portions of the image and vertically repeated signals for moving portions of the image.

Referring to FIG. 15, the signals generated by the interlace to progressive scan circuits 1350, 1352 and 1354 are converted into respective analog Y, I and Q signals by the DAC 1362. These signals are applied to the video signal processor and matrix amplifier unit 1364. The video signal processor part of the unit 1364 includes signal amplifying, DC level shifting, peaking, brightness control, contrast control and other conventional video signal processing circuits. The matrix amplifier part of the unit 1364 combines the luminance signal Y with the color difference signals I and Q to produce primary color signals R, G, and B. These primary color signals are amplified by display driver amplifiers in the unit 1364 and used to drive the widescreen color image display device 1370 which may be a widescreen kinescope.

Although the various embodiments of the present invention set forth above in reference to FIGS. 3 and 15 are described separately, it is contemplated that they may be used in virtually any combination to provide a variety of methods for displaying and recording a wideband widescreen EDTV signal.

What is claimed is:

1. A system for processing an encoded television signal, representing a widescreen image that has a widescreen aspect ratio which is greater than that of a conventional television image, said signal including a first component representing a central portion of said widescreen image, said central portion having a conventional aspect ratio, a second component representing portions of said widescreen image on either side of said central portion, and an additional component representing increased vertical detail in said widescreen image, comprising:
   means for applying said encoded television signal;
   decoding means for decoding said encoded television signal, including:
   means for generating a first signal representing said first component of said encoded television signal;
   means for generating a second signal representing said second component of said encoded television signal; and
   means for combining said first and second signals, exclusive of any signal representing said additional component, to generate a third signal representing said widescreen image and having a signal format that approximately conforms to a conventional television signal standard; and
   output means for providing said third signal as an output signal of said system.

2. The system set forth in claim 1, further comprising, recording means, coupled to said output means, for recording said output signal representing said widescreen television image.

3. The system set forth in claim 2, further comprising, widescreen display means coupled to receive the signal recorded by said recording means for displaying said widescreen television image.

4. The system set forth in claim 1, wherein said output means includes vertical interpolation means, coupled to receive said third signal, for vertically interpolating said third signal to generate said output signal which, when applied to a conventional television display device, produces an image having said widescreen aspect ratio.

5. The circuitry set forth in claim 4 wherein said vertical interpolation means includes:
   means for applying a horizontal line synchronizing signal, representing successive horizontal line intervals of said third signal;
   memory means for storing samples representing selected horizontal line intervals of said third signal, in response to a first control signal;
   sample processing means for combining samples of said third signal with samples provided by said memory means in a proportion determined by a second control signal; to generate interpolated output samples; and control means including:
   a source of digital value N, where N is a positive integer;
   digital value accumulating means, coupled to said source of digital value N and responsive to said horizontal line synchronizing signal for adding such digital value N to a stored value and for storing the resultant sum as said stored digital value;
   counter means coupled to receive said horizontal line synchronizing signal for developing a count value representing the number of horizontal line intervals of said third signal which have been applied to said interpolation means;
   means coupled to said digital value accumulating means and to said counting means for generating said first control signal when a value represented by the L most significant bit of said stored value equals said count value; and
   means for providing the M least significant bit of said stored value as said second control signal;
   wherein said stored value includes L+M bits, where L and M are positive integers, and wherein said vertical interpolation means produces lines of samples representing a video image which has been vertically compressed by a factor of $2^M/N$.

6. The system set forth in claim 4 further comprising, recording means, coupled to receive said output signal, for recording said output signal representing said widescreen television image.

7. The system set forth in claim 6, further comprising, conventional display means coupled to receive the signal recorded by said recording means for displaying said widescreen television image.

8. A system for processing an encoded wideband television signal, representing a widescreen image that has an aspect ratio, horizontal detail and vertical detail that are greater than that of a conventional television image represented by a conventional television signal which corresponds to a conventional television signal standard, said encoded signal including a first component representing a central portion of said widescreen image, said central portion having a conventional aspect ratio, a second component representing portions of said widescreen image on either side of said central portion, a third component representing the greater horizontal detail of said widescreen image, and a fourth component representing the greater vertical detail of said widescreen image, comprising:
   means for applying said encoded wideband television signal;

decoding means for partially decoding said encoded wideband television signal, including:

means for generating a first signal representing at least said central portion of said widescreen image;

means for generating a second signal representing the portions of said widescreen image on either side of said central portion; and means for combining said first and second signals to generate a third signal representing a television image that has a level of vertical detail substantially equal to said conventional image and an aspect ratio that is greater than said conventional aspect ratio;

output means for providing said third signal as an output signal of said system.

9. The apparatus set forth in claim 8, further comprising, a conventional consumer video tape recorder for recording said output signal.

10. The apparatus set forth in claim 9, further comprising, a widescreen display device, coupled to said tape recorder for displaying a widescreen image derived from the output signal recorded thereby.

11. The apparatus set forth in claim 10, wherein:

said output means includes means for generating a fourth signal representing the third component of said encoded signal, and means for combining said third and fourth signals to generate said output signal having a level of horizontal detail that is greater than that allowed by said conventional television signal standard, said output signal representing a television image that has a level of vertical detail substantially equal to that of said conventional image and an aspect ratio that is greater than that of said conventional image;

said conventional consumer video tape recorder includes means for recording video signals having bandwidths greater than that of said conventional television signal; and said widescreen display device includes means for processing signals applied thereto to produce an image having greater apparent vertical resolution than said conventional image.

12. The apparatus set forth in claim 9, wherein: said output means includes vertical interpolation means, coupled to receive said third signal, for vertically compressing said third signal to generate said output signal; and, further including conventional display means, coupled to said conventional consumer video tape recorder for producing said widescreen image, in correct proportion, from the output signal recorded on said conventional consumer video tape recorder.

13. The circuitry set forth in claim 12 wherein said vertical interpolation means includes:

means for applying a horizontal line synchronizing signal, representing successive horizontal line intervals of said third signal;

memory means for storing samples representing selected horizontal line intervals of said third signal, in response to a first control signal;

sample processing means for combining samples of said third signal with samples provided by said memory means in a proportion determined by a second control signal; to generate interpolated output samples; and control means including:

a source of digital value N, where N is a positive integer;

digital value accumulating means, coupled to said source of digital value N and responsive to said horizontal line synchronizing signal for adding said digital value N to a stored value and for storing the resultant sum as said stored digital value;

counter means coupled to receive said horizontal line synchronizing signal for developing a count value representing the number of horizontal line intervals of said third signal which have been applied to said interpolation means;

means coupled to said digital value accumulating means and to said counting means for generating said first control signal when a value representing by the L most significant bit of said stored value equals said count value; and means for providing the M least significant bit of said stored value as said second control signal;

wherein said stored value includes L+M bits, where L and M are positive integers, and wherein said vertical interpolation means produces lines of samples representing a video image which has been vertically compressed by a factor of $2^M/N$.

* * * * *